United States Patent
Ogata et al.

(10) Patent No.: US 12,552,889 B2
(45) Date of Patent: Feb. 17, 2026

(54) VISCOSITY INDEX IMPROVER, REFRIGERATOR OIL, AND WORKING FLUID COMPOSITION FOR REFRIGERATORS

(71) Applicants: SANYO CHEMICAL INDUSTRIES, LTD., Kyoto (JP); ENEOS Corporation, Tokyo (JP)

(72) Inventors: Kazuki Ogata, Kyoto (JP); Yoshimitsu Sugiyama, Kyoto (JP); Naohiro Torii, Kyoto (JP); Satoshi Goto, Tokyo (JP); Yuya Mizutani, Tokyo (JP); Hidetoshi Ogata, Tokyo (JP); Yuma Seki, Tokyo (JP); Tatsuki Nakajima, Tokyo (JP)

(73) Assignees: SANYO CHEMICAL INDUSTRIES, LTD., Kyoto (JP); ENEOS CORPORATION, Tokyo (JP)

( * ) Notice: Subject to any disclaimer, the term of this patent is extended or adjusted under 35 U.S.C. 154(b) by 30 days.

(21) Appl. No.: 18/571,504

(22) PCT Filed: Jun. 14, 2022

(86) PCT No.: PCT/JP2022/023716
§ 371 (c)(1),
(2) Date: Dec. 18, 2023

(87) PCT Pub. No.: WO2022/270342
PCT Pub. Date: Dec. 29, 2022

(65) Prior Publication Data
US 2024/0309137 A1   Sep. 19, 2024

(30) Foreign Application Priority Data
Jun. 21, 2021 (JP) ................. 2021-102534

(51) Int. Cl.
C08F 220/24 (2006.01)
C10M 147/04 (2006.01)
C10M 171/00 (2006.01)

(52) U.S. Cl.
CPC ......... C08F 220/24 (2013.01); C10M 147/04 (2013.01); C10M 171/008 (2013.01); C10M 2213/04 (2013.01)

(58) Field of Classification Search
CPC ............ C10N 2020/02; C10N 2030/02; C10N 2040/30; C10N 2020/101; C10M 147/04;
(Continued)

(56) References Cited

U.S. PATENT DOCUMENTS
4,886,520 A   12/1989   Le
5,015,406 A   5/1991    Le
(Continued)

FOREIGN PATENT DOCUMENTS
CN   101792517   8/2010
CN   106459802   2/2017
(Continued)

OTHER PUBLICATIONS

International Search Report issued Aug. 30, 2022 in International (PCT) Application No. PCT/JP2022/023716.

Primary Examiner — Vishal V Vasisth
(74) Attorney, Agent, or Firm — Wenderoth, Lind & Ponack, L.L.P.

(57) ABSTRACT

The present invention relates to a viscosity index improver containing a copolymer (A) that contains, as essential constituent monomers, a fluorine atom-containing monomer (a) represented by the following formula (1) and a monomer (b) represented by the following formula (2),
wherein the copolymer (A) has a solubility parameter of 8.1 to 10.0 $(cal/cm^3)^{1/2}$, and a mass ratio (b/a) of the monomer (b) to the monomer (a) in the monomers constituting the copolymer (A) is 0.01 to 42:

[Formula 1]

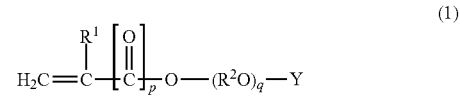

(1)

wherein $R^1$ represents a hydrogen atom or a methyl group; $R^2$ is a C2-C4 alkylene group; p is an integer of 0 or 1; q is an integer from 0 to 20, each $R^2$ may be the same as or different from each other when q is 2 or greater; and Y is a monovalent group in which one or more or all of hydrogen atoms in a C1-C40 hydrocarbon group are replaced by fluorine atoms, and

[Formula 2]

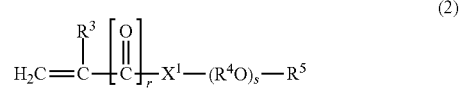

(2)

wherein $R^3$ represents a hydrogen atom or a methyl group; $—X^1—$ is a group represented by —O— or —NH—; $R^4$ is a C2-C4 alkylene group; r is an integer of 0 or 1; s is an integer from 0 to 20, and each $R^4$ may be the same as or different from each other when s is 2 or greater; and $R^5$ is a C1-C40 hydrocarbon group.

13 Claims, No Drawings

(58) Field of Classification Search
CPC ...... C10M 171/008; C10M 2207/2825; C10M 2213/04; C10M 2207/2835; C09K 5/045; C09K 3/00; C09K 5/04; C08F 220/24; C08F 222/145; C08F 220/1804; C08F 220/1802

See application file for complete search history.

(56) References Cited

U.S. PATENT DOCUMENTS

| | | | |
|---|---|---|---|
| 5,017,300 | A | 5/1991 | Raynolds |
| 5,976,399 | A | 11/1999 | Schnur |
| 2007/0254819 | A1* | 11/2007 | Fang .................. C10M 147/04 508/469 |
| 2017/0218292 | A1 | 8/2017 | Konno |
| 2018/0230397 | A1 | 8/2018 | Nakano et al. |
| 2018/0273817 | A1 | 9/2018 | Sawada et al. |
| 2018/0305599 | A1 | 10/2018 | Sawada et al. |
| 2019/0127659 | A1 | 5/2019 | Shimpo et al. |
| 2019/0322959 | A1 | 10/2019 | Knobloch et al. |
| 2020/0071632 | A1 | 3/2020 | Hagihara et al. |
| 2020/0347316 | A1 | 11/2020 | Yamamoto et al. |
| 2021/0024850 | A1* | 1/2021 | Perera .................. C10M 147/04 |

FOREIGN PATENT DOCUMENTS

| | | |
|---|---|---|
| CN | 107624120 | 1/2018 |
| CN | 110462009 | 11/2019 |
| CN | 112876626 | 6/2021 |
| JP | 1-245005 | 9/1989 |
| JP | 9-302370 | 11/1997 |
| JP | 2006-96809 | 4/2006 |
| JP | 2008-266656 | 11/2008 |
| JP | 2012-188520 | 10/2012 |
| JP | 5755469 | 7/2015 |
| JP | 2017-57278 | 3/2017 |
| JP | 6925323 | 3/2017 |
| JP | 2017-197662 | 11/2017 |
| JP | 2019-158233 | 9/2019 |
| JP | 2019-529687 | 10/2019 |
| JP | 2020-105295 | 7/2020 |
| JP | 6793127 | 12/2020 |
| JP | 6826987 | 2/2021 |
| WO | 2018/057678 | 3/2018 |
| WO | 2019/111752 | 6/2019 |
| WO | 2019/183365 | 9/2019 |

* cited by examiner

VISCOSITY INDEX IMPROVER, REFRIGERATOR OIL, AND WORKING FLUID COMPOSITION FOR REFRIGERATORS

TECHNICAL FIELD

The present invention relates to a viscosity index improver, a refrigerating machine oil, and a working fluid composition for refrigerating machines.

BACKGROUND ART

Due to the recent problem of ozone layer depletion, hydrofluorocarbon (HFC) has come to be used as a refrigerant for refrigerating machine oils, instead of chlorofluorocarbon (CFC) and hydrochlorofluorocarbon (HCFC). Further, a refrigerant having a global warming potential (GWP) lower than that of HFC refrigerant has been developed. In recent years, a polyol esters (POE) and the like have been used as a lubricating oil for refrigerating machine oil (oxygen atom-containing base oil) because of its good compatibility with such a refrigerant (e.g. Patent Literatures 1 and 2).

Further, in view of recent energy saving measures, it is required for the refrigerating machine oil to further increase the viscosity index, but there is a limit to increasing the viscosity index by changing the composition of POE. Meanwhile, a known refrigerating machine oil is a refrigerating machine oil in which viscosity index improver such as a polyalkylene glycol or an alkyl methacrylate copolymer is used to improve the viscosity index (e.g. Patent Literatures 3 to 7). However, the viscosity index improver has insufficient compatibility with a refrigerant, and particularly the compatibility at a low temperature is insufficient.

Whereas, it is known that a copolymer containing a fluorine atom-containing monomer as a constituent monomer is used as a viscosity index improver (e.g. Patent Literatures 8 and 9). However, the viscosity index improvers are not dissolved in a refrigerating machine oil containing a refrigerant and a lubricating oil, and the improvers cannot be used as viscosity index improvers for refrigerating machine oils.

CITATION LIST

Patent Literature

Patent Literature 1: JP H09-302370 A
Patent Literature 2: JP 2019-158233 A
Patent Literature 3: JP 2017-057278 A
Patent Literature 4: JP 6925323 B
Patent Literature 5: JP 6826987 B
Patent Literature 6: JP 6793127 B
Patent Literature 7: JP 2017-197662 A
Patent Literature 8: JP H01-245005 A
Patent Literature 9: JP 5755469 B

SUMMARY OF INVENTION

Technical Problem

An object of the present invention is to provide a viscosity index improver suitable for a refrigerating machine oil, which is excellent in solubility in a refrigerant and an oxygen atom-containing base oil, has a high viscosity index improving effect when used in the refrigerating machine oil, and can obtain a refrigerating machine oil having excellent low-temperature characteristics, and to provide a refrigerating machine oil which contains the viscosity index improver and a working fluid composition for refrigerating machines which contains the refrigerating machine oil.

Solution to Problem

As a result of intensive studies, the present inventors have reached the present invention.

That is, the present invention provides a viscosity index improver containing a copolymer (A) that contains, as essential constituent monomers, a fluorine atom-containing monomer (a) represented by the following formula (1) and a monomer (b) represented by the following formula (2), wherein the copolymer (A) has a solubility parameter of 8.1 to 10.0 $(\text{cal/cm}^3)^{1/2}$, and a mass ratio (b/a) of the monomer (b) to the monomer (a) in the monomers constituting the copolymer (A) is 0.01 to 42:

[Formula 1]

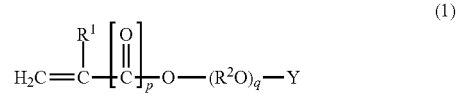

wherein $R^1$ represents a hydrogen atom or a methyl group; $R^2$ is a C2-C4 alkylene group; p is an integer of 0 or 1; q is an integer from 0 to 20, each $R^2$ may be the same as or different from each other when q is 2 or greater; and Y is a monovalent group in which one or more or all of hydrogen atoms in a C1-C40 hydrocarbon group are replaced by fluorine atoms, and

[Formula 2]

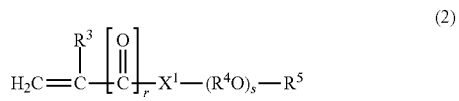

wherein $R^3$ represents a hydrogen atom or a methyl group; $—X^1—$ is a group represented by $—O—$ or $—NH—$; $R^4$ is a C2-C4 alkylene group; r is an integer of 0 or 1; s is an integer from 0 to 20, and each $R^4$ may be the same as or different from each other when s is 2 or greater; and $R^5$ is a C1-C40 hydrocarbon group.

One aspect of the present invention is a refrigerating machine oil that contains a lubricant base oil and the viscosity index improver.

Another aspect of the present invention is a working fluid composition for refrigerating machines that contains the refrigerating machine oil and a refrigerant.

Advantageous Effects of Invention

The viscosity index improver of the present invention is excellent in solubility in a refrigerant and an oxygen atom-containing base oil, has a high viscosity index improving effect when used in the refrigerating machine oil, and exerts an effect of obtaining a refrigerating machine oil having excellent low-temperature characteristics.

DESCRIPTION OF EMBODIMENTS

A viscosity index improver of the present invention contains a copolymer (A) that contains, as essential constituent monomers, a fluorine atom-containing monomer (a) represented by the following formula (1) and a monomer (b) represented by the following formula (2), wherein the copolymer (A) has a solubility parameter of 8.1 to 10.0 $(\text{cal/cm}^3)^{1/2}$, and a mass ratio (b/a) of the monomer (b) to the monomer (a) in the monomers constituting the copolymer (A) is 0.01 to 42:

[Formula 3]

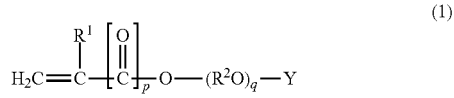

(1)

wherein $R^1$ represents a hydrogen atom or a methyl group; $R^2$ is a C2-C4 alkylene group; p is an integer of 0 or 1; q is an integer from 0 to 20, each $R^2$ may be the same as or different from each other when q is 2 or greater; and Y is a monovalent group in which one or more or all of hydrogen atoms in a C1-C40 hydrocarbon group are replaced by fluorine atoms, and

[Formula 4]

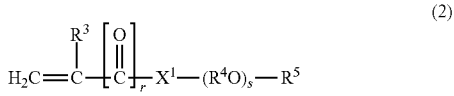

(2)

wherein $R^3$ represents a hydrogen atom or a methyl group; —$X^1$— is a group represented by —O— or —NH—; $R^4$ is a C2-C4 alkylene group; r is an integer of 0 or 1; s is an integer from 0 to 20, and each $R^4$ may be the same as or different from each other when s is 2 or greater; and $R^5$ is a C1-C40 hydrocarbon group.

Preferably, the constituent unit derived from the monomer (a) has a solubility parameter of 6.5 to 9.0 $(\text{cal/cm}^3)^{1/2}$.

The weight-average molecular weight of the copolymer (A) is preferably 1,000 to 2,000,000.

Preferably, the viscosity index improver of the present invention further contains an oxygen atom-containing base oil, in addition to the copolymer (A). The oxygen atom-containing base oil (also referred to as "oxygen atom-containing base oil (B)") contained in the viscosity index improver of the present invention is preferably used as a polymerization solvent in copolymer synthesis or a diluting solvent for the copolymer, but may be the same as or different from an oxygen atom-containing base oil used as a lubricant base oil in the refrigerating machine oil described later.

Copolymer (A)

In the present invention, the copolymer (A) contains, as essential constituent monomers, the fluorine atom-containing monomer (a) represented by the formula (1) and a monomer (b) represented by the formula (2), the copolymer (A) has a solubility parameter of 8.1 to 10.0 $(\text{cal/cm}^3)^{1/2}$, and a mass ratio (b/a) of the monomer (b) to the monomer (a) in the monomers constituting the copolymer (A) is 0.01 to 42.

The monomer (a) will be described.

In the formula (1), $R^1$ represents a hydrogen atom or a methyl group, and the methyl group is preferable from the viewpoint of viscosity index improving effect.

In the formula (1), $R^2$ represents a C2-C4 alkylene group. Examples include an ethylene group, an isopropylene group, a 1,2- or 1,3-propylene group, an isobutylene group, and a 1,2-, 1,3- or 1,4-butylene group. An ethylene group is preferred from the viewpoint of viscosity index improving effect.

$R^2O$ represents a C2-C4 alkyleneoxy group. Examples include an ethyleneoxy group, a 1,2- or 1,3-propyleneoxy group, and a 1,2-, 1,3- or 1,4-butyleneoxy group.

p is an integer of 0 or 1.

q is an integer from 0 to 20, preferably an integer from 0 to 4, more preferably an integer from 0 to 2, from the viewpoint of solubility in the oxygen atom-containing base oil (B).

Each $R^2$ may be the same as or different from each other when q is 2 or greater, and the $(R^2O)_q$ moiety may be in a block form or a random form. The term "block form" means that two or more $(R^2O)$ moieties having the same $R^2$ are continuously bonded.

In the formula (1), Y is a monovalent group in which one or more or all of hydrogen atoms in a C1-C40 hydrocarbon group are replaced by fluorine atoms.

Examples of the monovalent group in which one or more of hydrogen atoms in the hydrocarbon group are replaced by fluorine atoms include a monovalent group in which one or more of hydrogen atoms in a linear or branched chain aliphatic hydrocarbon group are replaced by fluorine atoms [e.g. C1-C40 linear partially fluorinated alkyl groups {such as 2,2,2-trifluoroethyl group (—$CH_2CF_3$), 2,2,3,3-tetrafluoropropyl group (—$CH_2CF_2CHF_2$), 2,2,3,3,3-pentafluoropropyl group (—$CH_2CF_2CF_3$), 1H,1H,5H-octafluoropentyl group (—$CH_2$ $(CF_2)_3CHF_2$), 1H,1H,2H,2H-nonafluorohexyl group (—$CH_2CH_2$ $(CF_2)_3CF_3$), 1H,1H,2H,2H-tridecafluorooctyl group (—$CH_2CH_2$ $(CF_2)_5CF_3$), 1H,1H,2H,2H-heptadecafluorooctyl group (—$CH_2CH_2(CF_2)_7CF_3$), 1H,1H-nonadecafluorodecyl group (—$CH_2$ $(CF_2)_8CF_3$), —$CH_2$ $(CF_2)_9CF_3$, —$CH_2$ $(CF_2)_{10}CF_3$, —$CH_2$ $(CF_2)_{12}CF_3$, —$CH_2$ $(CF_2)_{15}CF_3$, —$CH_2$ $(CF_2)_{15}CF_3$, —$CH_2$ $(CF_2)_{20}CF_3$, —$CH_2$ $(CF_2)_{22}CF_3$, —$CH_2$ $(CF_2)_{24}CF_3$, —$CH_2$ $(CF_2)_{26}CF_3$, —$CH_2(CF_2)_{28}CF_3$, —$CH_2(CF_2)_{30}CF_3$, —$(CH_2)_2CF_3$, —$(CH_2)_3CF_3$, —$(CH_2)_4CF_3$, —$(CH_2)_5CF_3$, —$(CH_2)_6CF_3$, —$(CH_2)_7CF_3$, —$(CH_2)_8CF_3$, —$(CH_2)_9CF_3$, —$(CH_2)_{10}CF_3$, —$(CH_2)_{12}CF_3$, —$(CH_2)_{14}CF_3$, —$(CH_2)_{16}CF_3$, —$(CH_2)_{18}CF_3$, —$(CH_2)_{20}CF_3$}, and C3-C30 branched partially fluorinated alkyl groups {such as 1,1,1,3,3,3-hexafluoroisopropyl group (—$CH(CF_3)_2$), —$CH(CF_3)CF_2CF_3$, —$CH_2CH(CF_3)_2$, —$CH(CF_3)(CF_2)_3CHF_2$, —$CH(CF_2CF_3)$ $(CF_2)_2CF_3$}, C2-C40 partially fluorinated alkylene groups {such as a difluoroethylene group}], C3-C40 partially fluorinated alicyclic hydrocarbon groups {such as a 2-, 3-, or 4-fluorocyclohexyl group and a 4-(trifluoromethyl)cyclohexyl group}, and C6-C40 partially fluorinated aromatic hydrocarbon groups {such as a 2-, 3-, or 4-fluorophenyl group, and a 2-, 3-, or 4-fluorobenzyl group}.

Examples of the monovalent group in which all hydrogen atoms in the hydrocarbon group are replaced by fluorine atoms include a monovalent group in which all hydrogen atoms in a linear or branched chain aliphatic hydrocarbon group are replaced by fluorine atoms [e.g. C1-C40 linear perfluoroalkyl groups {such as a trifluoromethyl group (—$CF_3$), a pentafluoroethyl group (—$CF_2CF_3$), a heptafluoropropyl group (—$(CF_2)_2CF_3$), a nonafluorobutyl group (—$(CF_2)_3CF_3$), a perfluoropentyl group (—$(CF_2)_4CF_3$), a perfluorohexyl group (—$(CF_2)_5CF_3$), a perfluoroheptyl group (—$(CF_2)_6CF_3$), a perfluorooctyl group (—$(CF_2)_7CF_3$), a perfluorononyl group (—$(CF_2)_8CF_3$), a perfluorodecyl group (—$(CF_2)_9CF_3$), —$(CF_2)_{10}CF_3$, —(CF$_2$)$_{11}$CF$_3$, —(CF$_2$)$_{13}$CF$_3$, —(CF$_2$)$_{15}$CF$_3$, —(CF$_2$)$_{17}$CF$_3$, —(CF$_2$)$_{19}$CF$_3$, —(CF$_2$)$_{21}$CF$_3$, —(CF$_2$)$_{23}$CF$_3$, —(CF$_2$)$_{29}$CF$_3$, —(CF$_2$)$_{39}$CF$_3$}, C3-C40 branched perfluoroalkyl groups {such as —CF(CF$_3$)$_2$, —C(CF$_3$)$_3$, —CF(CF$_3$)CF$_2$CF$_3$, —CF$_2$CF(CF$_3$)$_2$, —CF(CF$_3$)(CF$_2$)$_2$CF$_3$, —CF(CF$_2$CF$_3$)CF$_2$CF$_3$, —CF$_2$C(CF$_3$)$_3$, —CF(CF$_3$)(CF$_2$)$_3$CF$_3$, —CF(CF$_2$CF$_3$)(CF$_2$)$_2$CF$_3$, —(CF$_2$)$_2$C(CF$_3$)$_3$, —CF(CF$_3$)(CF$_2$)$_4$CF$_3$, —CF(CF$_2$CF$_2$CF$_3$)(CF$_2$)$_2$CF$_3$, —(CF$_2$)$_3$C(CF$_3$)$_3$, —CF(CF$_3$)(CF$_2$)$_5$CF$_3$, —CF(CF$_2$CF$_2$CF$_2$CF$_3$)(CF$_2$)$_2$CF$_3$, —(CF$_2$)$_4$C(CF$_3$)$_3$, —CF(CF$_3$)(CF$_2$)$_6$CF$_3$, —CF(CF$_2$CF$_2$CF$_2$CF$_3$)(CF$_2$)$_2$CF$_3$, —(CF$_2$)$_5$C(CF$_3$)$_3$, —CF(CF$_3$)(CF$_2$)$_7$CF$_3$, —CF(CF$_2$CF$_2$CF$_2$CF$_2$CF$_3$)(CF$_2$)$_2$CF$_3$, —(CF$_2$)$_6$C(CF$_3$)$_3$}, a C2-C40 perfluoroalkylene groups {such as a tetrafluoroethylene group}], C3-C40 perfluoroalicyclic hydrocarbon groups {such as a perfluorocyclohexyl group}, and C6-C40 perfluoroaromatic hydrocarbon groups {such as a perfluorophenyl group}.

From the viewpoint of viscosity index improving effect, Y in the formula (1) is preferably a monovalent group in which one or more or all of hydrogen atoms in a C1-C24 linear or branched chain aliphatic hydrocarbon group are replaced by fluorine atoms, more preferably a monovalent group in which one or more or all of hydrogen atoms in a C8-C20 linear or branched chain aliphatic hydrocarbon group are replaced by fluorine atoms, and particularly preferably a monovalent group in which one or more or all of hydrogen atoms in a C10-C18 linear or branched chain aliphatic hydrocarbon group are replaced by fluorine atoms.

From the viewpoint of easy availability, a monovalent group in which one or more or all of hydrogen atoms in a C2-C8 linear or branched chain aliphatic hydrocarbon group are replaced by fluorine atoms is preferable.

From the viewpoint of the handling ability of the viscosity index improver and the solubility in the oxygen atom-containing base oil (B), a monovalent group in which one or more or all of hydrogen atoms in a C1-C4 linear or branched chain aliphatic hydrocarbon group are replaced by fluorine atoms is preferable.

One type of the monomer (a) may be used alone, or two or more types thereof may be used in combination.

The monomer (a) can be produced by a known method, and can be obtained by, for example, an esterification reaction of C1-C40 aliphatic or aromatic monoalcohol having a fluorine atom with (meth)acrylic acid, an esterification reaction of an adduct of alkylene oxide (including C2-C4 alkylene oxide, such as ethylene oxide, propylene oxide, or butylene oxide) with C1-C40 aliphatic or aromatic monoalcohol having a fluorine atom with (meth)acrylic acid, an etherification reaction of a vinyl ether compound having a hydroxyl group (such as 2-hydroxyethyl vinyl ether, diethylene glycol monovinyl ether, or 4-hydroxybutyl vinyl ether) with C1-C40 aliphatic or aromatic monoalcohol having a fluorine atom, a reaction of halogenated alkyl (C2-C4 in a halogenated alkyl group) vinyl ether (such as 2-chloroethyl vinyl ether) with C1-C40 aliphatic or aromatic monoalcohol having a fluorine atom in the presence of a palladium catalyst and an aliphatic amine, or the like.

In the present invention, "(meth)acrylic acid" means "acrylic acid and/or methacrylic acid".

Examples of commercially available products of the monomer (a) include 2,2,2-trifluoroethyl acrylate (product name "Viscoat 3F"), 2,2,3,3-tetrafluoropropyl acrylate (product name "Viscoat 4F"), 1H,1H,5H-octafluoropentyl acrylate (product name "Viscoat 8F"), 1H,1H,5H-octafluoropentyl methacrylate (product name "Viscoat 8FM"), 1H,1H,2H,2H-tridecafluorooctyl acrylate (product name "Viscoat 13F")(all of the above are manufactured by OSAKA ORGANIC CHEMICAL INDUSTRY LTD.), 2,2,2-trifluoroethyl methacrylate (product name "Light Ester M-3F", manufactured by Kyoeisha Chemical Co., Ltd.), 2,2,3,3,3-pentafluoropropyl methacrylate (manufactured by Tokyo Chemical Industry Co., Ltd.), 1,1,1,3,3,3-hexafluoroisopropyl methacrylate (manufactured by Tokyo Chemical Industry Co., Ltd.) and 1H,1H-nonadecafluorodecyl methacrylate (product name "1H,1H-Perfluoro-n-decyl methacrylate", manufactured by FUJIFILM Wako Pure Chemical Corporation), 2-(perfluorooctyl)ethyl methacrylate (manufactured by Tokyo Chemical Industry Co., Ltd.), {2-(perfluorobutyl) ethyl methacrylate, 2-(perfluorohexyl)ethyl methacrylate, 1H,1H,3H-tetrafluoropropyl methacrylate, 1H,1H,5H-octafluoropentyl methacrylate, 1H,1H,7H-dodecafluoroheptyl methacrylate, 1H,1-(trifluoromethyl)trifluoroethyl methacrylate, 1H,1H,3H-hexafluorobutyl methacrylate} manufactured by Daikin Industries, Ltd., 2-(perfluorobutyl)ethyl methacrylate (product name "CHEMINOX FAMAC-4"), (2-perfluorohexyl)ethyl methacrylate (product name "CHEMINOX FAMAC-6", both manufactured by UNIMATEC Co., Ltd.), and hexafluoro-2-propyl methacrylate ("product name HFIP-M", manufactured by Central Glass Co., Ltd.).

The monomer (a) is preferably a (meth)acryloyl monomer having a fluoroalkyl group in which one or more or all of hydrogen atoms in a C2-C4 linear or branched alkyl group are replaced by fluorine atoms, more preferably 2,2,2-trifluoroethyl(meth)acrylate, from the viewpoint of the handling ability of the viscosity index improver and the solubility in the oxygen atom-containing base oil (B).

From the viewpoint of solubility in the refrigerant (C), as the monomer (a), a (meth)acryloyl monomer having a fluoroalkyl group in which one or more or all of hydrogen atoms in a C2-C8 linear or branched alkyl group are replaced by fluorine atoms is preferable, and 2-(perfluorohexyl)ethyl (meth)acrylate is more preferable.

In the present invention, the solubility parameter (hereinafter, abbreviated as "SP value") of the constituent unit derived from the monomer (a)(structure in which carbon-carbon double bonds of the monomer (a) react to form a single bond) is preferably 6.5 to 9.0 (cal/cm$^3$)$^{1/2}$, more preferably 8.0 to 9.0 (cal/cm$^3$)$^{1/2}$, from the viewpoint of solubility in the oxygen atom-containing base oil (B).

For example, the SP value of the monomer tends to be small when Y in the formula (1) has a high proportion of hydrogen atoms in an alkyl group to be replaced by fluorine atoms, has a high degree of branching, or has a large number of carbon atoms. Meanwhile, the SP value of the monomer tends to be large when Y in the formula (1) has a low proportion of hydrogen atoms in an alkyl group to be replaced by fluorine atoms, has a low degree of branching, or has a small number of carbon atoms.

The SP value in the present invention means a value calculated by the mathematical formula (28) (page 153) using the numerical values (the heat of evaporation and the molar volume of atoms or functional groups at 25° C.) described on page 152 (Table 5) of the Fedors method (Polymer Engineering and Science, February, 1974, Vol. 14, No. 2, P 147-154). Specifically, the SP value can be calculated by substituting the numerical values corresponding to the types of atoms and atomic groups in the molecular structure based on $\Delta e_i$ and $v_i$ values: parameters of the Fedors method described in Table 1 below into the following equation.

$$SP \text{ value} = \left(\sum \Delta e_i / \sum \Delta v_i\right)^{1/2}$$

TABLE 1

| Atom or group | $\Delta e_i$, cal/mole | $\Delta v_i$, cm³/mole | Atom or group | $\Delta e_i$, cal/mole | $\Delta v_i$, cm³/mole |
| --- | --- | --- | --- | --- | --- |
| $CH_3$ | 1125 | 33.5 | Cl | 2760 | 24.0 |
| $CH_2$ | 1130 | 16.1 | Cl (disubstituted) | 2300 | 26.0 |
| CH | 820 | −1.0 | Cl (trisubstituted) | 1800 | 27.3 |
| C | 350 | −19.2 | Br | 3700 | 30.0 |
| $H_2C=$ | 1030 | 28.5 | Br (disubstituted) | 2950 | 31.0 |
| —CH= | 1030 | 13.5 | Br (trisubstituted) | 2550 | 32.4 |
| C= | 1030 | −5.5 | I | 4550 | 31.5 |
| HC≡ | 920 | 27.4 | I (disubstituted) | 4000 | 33.3 |
| —C≡ | 1690 | 6.5 | I (trisubstituted) | 3900 | 37.0 |
| Phenyl* | 7630 | 71.4 | B | 3300 | −2.0 |
| Phenylene (o, m, p)* | 7630 | 52.4 | Al | 3300 | −2.0 |
| Phenyl (trisubstituted)* | 7630 | 33.4 | Ga | 3300 | −2.0 |
| Phenyl (tetrasubstituted)* | 7630 | 14.4 | In | 3300 | −2.0 |
| Phenyl (pentasubstituted)* | 7630 | −4.6 | Ti | 3300 | −2.0 |
| Phenyl (hexasubstituted)+ | 7630 | −23.6 | Si | 810 | 0 |
| Ring closure 5 or more atoms | 250 | 16 | Ge | 1930 | −1.5 |
| Ring closure 3 or 4 atoms | 750 | 18 | Sn | 2700 | 1.5 |
| Conjugation in ring for each double bond | 400 | −2.2 | Pb | 4100 | 2.5 |
|  |  |  | P | 2250 | −1.0 |
| Halogen attached to carbon atom with double bond | −20 percent of $\Delta e_i$ of halogen | 4.0 | As | 3100 | 7.0 |
|  |  |  | Sb | 3900 | 8.9 |
| $CO_3$ (carbonate) | 4200 | 22.0 | Bi | 5100 | 9.5 |
| COOH | 6600 | 28.5 | Se | 4100 | 16.0 |
| $CO_2$ | 4300 | 18.0 | Te | 4800 | 17.4 |
| CO | 4150 | 10.8 | Zn | 3460 | 2.5 |
| CHO (aldehyde) | 5100 | 22.3 | Cd | 4250 | 6.5 |
| $CO_2C_3$ (oxalate) | 6400 | 37.3 | Hg | 5450 | 7.5 |
| $C_3O_2$ (anhydride) | 7300 | 30.0 |  |  |  |
| HCOO (formate) | 4300 | 32.5 |  |  |  |
| $CONH_3$ | 10000 | 17.5 |  |  |  |
| CONH | 8000 | 9.5 |  |  |  |
| CON | 7050 | −7.7 |  |  |  |
| HCON | 6600 | 11.3 |  |  |  |
| HCONH | 10500 | 27.0 |  |  |  |
| COCl | 5000 | 38.0 |  |  |  |
| $NH_2$ | 3000 | 19.2 |  |  |  |
| NH | 2000 | 4.5 |  |  |  |
| N | 1000 | −9.0 |  |  |  |
| —N= | 2800 | 5.0 |  |  |  |
| CN | 6100 | 24.0 |  |  |  |
| $NO_2$ (aliphatic) | 7000 | 24.0 |  |  |  |
| $NO_2$ (aromatic) | 3570 | 32.0 |  |  |  |
| $NO_3$ | 5000 | 33.5 |  |  |  |
| $NO_2$ (nitrite) | 2800 | 33.5 |  |  |  |
| SCN | 4800 | 37.0 |  |  |  |
| NCO | 6800 | 35.0 |  |  |  |
| $NF_2$ | 1830 | 33.1 |  |  |  |
| NF | 1210 | 24.5 |  |  |  |
| O | 800 | 3.8 |  |  |  |
| OH | 7120 | 10.0 |  |  |  |
| OH (disubstituted or on adjacent C atoms) | 5220 | 13.0 |  |  |  |
| $PO_4$ | 5000 | 28.0 |  |  |  |
| $PO_3$ | 3400 | 22.7 |  |  |  |
| SH | 3450 | 28.0 |  |  |  |
| S | 3380 | 12 |  |  |  |
| $S_3$ | 5700 | 23.0 |  |  |  |
| $SO_3$ | 4500 | 27.6 |  |  |  |
| $SO_4$ | 6800 | 31.6 |  |  |  |
| F | 1000 | 18.0 |  |  |  |
| F (disubstituted) | 850 | 20.0 |  |  |  |
| F (trisubstituted) | 550 | 22.0 |  |  |  |
| $CF_2$ (for perfluoro compounds) | 1020 | 23.0 |  |  |  |
| $CF_3$ (for perfluoro compounds) | 1020 | 57.5 |  |  |  |

For example, the case of 2,2,2-trifluoroethyl methacrylate is as follows.

—CH$_2$—C(CH$_3$)—CO—O—CH$_2$—CF$_3$

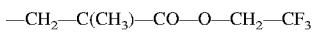

$$SP \text{ value} = \{(1180 + 350 + 1125 + 4300 + 1180 + 1020)/$$
$$(16.1 - 19.2 + 33.5 + 18.0 + 16.1 + 57.5)\}^{1/2} = 8.66$$

When two or more types of monomers (a) are used in combination in the copolymer (A), preferably, a value obtained by calculating the SP value of each of structures, in which carbon-carbon double bonds of plural monomers constituting the monomer (a) react to form a single bond, by the above method, and arithmetically averaging the SP values of the monomers (a) based on the mass fraction of the constituent monomer units satisfies the range of the SP value of the monomer (a).

Next, the monomer (b) will be described.

In the formula (2), $R^3$ represents a hydrogen atom or a methyl group, and the methyl group is preferable from the viewpoint of viscosity index improving effect.

r is an integer of 0 or 1, and r is preferably equal to 0 from the viewpoint of lubricity.

—$X^1$— is a group represented by —O— or —NH—.

In the formula (2), $R^4$ represents a C2-C4 alkylene group. Examples include an ethylene group, an isopropylene group, a 1,2- or 1,3-propylene group, an isobutylene group, and a 1,2-, 1,3- or 1,4-butylene group. An ethylene group is preferred from the viewpoint of viscosity index improving effect.

$R^4O$ represents a C2-C4 alkyleneoxy group. Examples include an ethyleneoxy group, a 1,2- or 1,3-propyleneoxy group, and a 1,2-, 1,3- or 1,4-butyleneoxy group. An ethyleneoxy group is preferred from the viewpoint of solubility in the oxygen atom-containing base oil (B).

s is an integer from 0 to 20, preferably an integer from 0 to 2 from the viewpoint of solubility in the oxygen atom-containing base oil (B).

Each $R^4$ may be the same as or different from each other when s is 2 or greater, and the $(R^4O)_s$ moiety may be in a block form or a random form. The term "block form" means that two or more ($R^4O$) moieties having the same $R^4$ are continuously bonded.

In the formula (2), $R^5$ represents a C1-C40 hydrocarbon group, and examples include C1-C40 chain aliphatic hydrocarbon groups [such as a methyl group, an ethyl group, C3-C40 linear alkyl groups (such as a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-octadecyl group, a n-icosyl group, a n-docosyl group, a n-tetracosyl group, a n-hexacosyl group, a n-octacosyl group, a n-triacontyl group, and a n-tetracontyl group), C3-C40 branched alkyl groups {such as an isopropyl group, an isobutyl group, a tert-butyl group, a sec-butyl group, an isopentyl group, a 1-ethylpropyl group, a 1,1-dimethylpropyl group, a 2-methylbutyl group, an isohexyl group, a 2-methylpentyl group, an isoheptyl group, a 2-methylhexyl group, an isooctyl group, a 2-ethylhexyl group, an isononyl group, an isodecyl group, and an isododecyl group}, groups having a branch at the 2-position containing 20 to 40 carbon atoms [such as a 2-dodecyltridecyl group, 2-alkyl (C6-C13 in an alkyl group) tetradecyl groups {such as a 2-dodecyltetradecyl group}, 2-alkyl (C4-C15 in an alkyl group) hexadecyl groups {such as a 2-dodecylhexadecyl group, and a 2-tetradecylhexadecyl group}, 2-alkyl (C2-C17 in an alkyl group) octadecyl groups {such as a 2-tetradecyl octadecyl group and a 2-hexadecyl octadecyl group}, 2-alkyl (C1-C19 in an alkyl group) icosyl groups {such as a 2-hexadecyl icosyl group}, 2-alkyl (C1-C18 in an alkyl group) docosyl groups, 2-alkyl (C1-C16 in an alkyl group group) tetracosyl groups, 2-alkyl (C1-C14 in an alkyl group) hexacosyl groups, 2-alkyl (C1-C12 in an alkyl group) octacosyl groups, and 2-alkyl (C1-C10 in an alkyl group) triacontyl groups]], alicyclic hydrocarbon groups [such as a cyclohexyl group], and aromatic hydrocarbon groups [such as a phenyl group].

$R^5$ is preferably a C8-C20 alkyl group, more preferably a C10-C18 alkyl group, from the viewpoint of viscosity index improving effect.

From the viewpoint of solubility in the refrigerant (C), a C1-C6 alkyl group is preferable, a C1-C4 alkyl group is more preferable, and a C3-C4 branched alkyl group is particularly preferable.

Specific examples of the monomer (b) include (meth)acrylic acid alkyl ester having a C1-C40 alkyl group {such as methyl(meth)acrylate, ethyl(meth)acrylate, n-propyl (meth)acrylate, isopropyl(meth)acrylate, n-butyl(meth)acrylate, isobutyl(meth)acrylate, sec-butyl(meth)acrylate, tert-butyl(meth)acrylate, hexyl(meth)acrylate, n-dodecyl(meth)acrylate, n-octadecyl(meth)acrylate, 2-n-dodecylhexadecyl (meth)acrylate, and 2-n-tetradecyl octadecyl(meth)acrylate}, alkyl vinyl ether having a C1-C40 alkyl group {such as methyl vinyl ether and ethyl vinyl ether}, an etherified product of an alkylene oxide (C2-C4) adduct of hydroxyalkyl (C2-C4 in a hydroxyalkyl group) vinyl ether or hydroxyalkyl vinyl ether and C1-C40 alcohol, N-alkyl (meth)acrylamide having a C1-C40 alkyl group {such as N-methyl(meth)acrylamide and N-ethyl(meth)acrylamide}, and an esterified product of an AO adduct of C1-C40 alcohol and (meth)acrylic acid.

The monomer (b) is preferably a (meth)acrylic acid alkyl ester having a C1-C6 alkyl group, more preferably a (meth)acrylic acid alkyl ester having a C1-C4 alkyl group {such as ethyl(meth)acrylate, n-propyl(meth)acrylate, iso-propyl (meth)acrylate, n-butyl(meth)acrylate, isobutyl(meth)acrylate, sec-butyl(meth)acrylate, tert-butyl(meth)acrylate, or hexyl(meth)acrylate}, more preferably a (meth)acrylic acid alkyl ester having a C2-C4 alkyl group {such as ethyl(meth)acrylate, isopropyl(meth)acrylate, isobutyl(meth)acrylate, or and tert-butyl(meth)acrylate}, and particularly preferably isobutyl(meth)acrylate, isopropyl(meth)acrylate, or tert-butyl(meth)acrylate, from the viewpoint of solubility in the refrigerant (C).

One type of the monomer (b) may be used, or two or more types thereof may be used in combination.

The SP value of the constituent unit derived from the monomer (b)(structure in which carbon-carbon double bonds of the monomer (b) react to form a single bond) is preferably 8.5 to 10.0 (cal/cm$^3$)$^{1/2}$, more preferably 8.7 to 9.8 (cal/cm$^3$)$^{1/2}$, from the viewpoint of adjusting the SP value of the copolymer to an appropriate level.

In the present invention, the copolymer (A) may contain, as constituent monomers, a nitrogen atom-containing vinyl monomer (c), an aliphatic hydrocarbon-based vinyl monomer (d), an alicyclic hydrocarbon-based vinyl monomer (e), an aromatic hydrocarbon-based vinyl monomer (f), a vinyl ester (g), a vinyl ketone (h), an epoxy group-containing vinyl monomer (i), a halogen element-containing vinyl monomer (j) other than the monomer (a), an unsaturated polycarboxylic acid ester (k), a hydroxyl group-containing vinyl monomer (1), an ionizable group-containing vinyl monomer (m), and the like, in addition to the monomer (a) and the monomer (b).

Examples of the nitrogen atom-containing vinyl monomer (c) include an amide group-containing vinyl monomer (c1), a nitro group-containing monomer (c2), a primary to tertiary amino group-containing vinyl monomer (c3), a quaternary ammonium base-containing vinyl monomer (c4), an amphoteric vinyl monomer (c5), and a nitrile group-containing monomer (c6).

(c1) Amide Group-Containing Vinyl Monomer

Examples include those having a nitrogen atom only in an amide group, such as (meth)acrylamides, dialkyl (C1-C4) substituted (meth)acrylamides [such as N,N-dimethyl(meth) acrylamide, N,N-diethyl(meth)acrylamide, and N,N-di-n-butyl(meth)acrylamide], and N-vinylcarboxylic acid amides [such as N-vinylformamide, N-vinylacetamide, N-vinyl-n- or isopropionylamide, and N-vinylhydroxyacetamide].

(c2) Nitro Group-Containing Monomer

Examples include 4-nitrostyrene.

(c3) Primary to Tertiary Amino Group-Containing Vinyl Monomer

Primary amino group-containing vinyl monomers {such as C3-C6 alkenylamines [such as (meth)allylamine and crotylamine], aminoalkyl (C2-C6)(meth)acrylates [such as aminoethyl(meth)acrylate]}; secondary amino group-containing vinyl monomers {such as alkyl (C1-C6) aminoalkyl (C2-C6)(meth)acrylate [such as t-butylaminoethyl methacrylate and methylaminoethyl(meth)acrylate], diphenylamine(meth)acrylamides [such as 4-diphenylamine(meth)acrylamide and 2-diphenylamine(meth)acrylamide], C6-C12 dialkenylamines [such as di(meth)allylamine]}; tertiary amino group-containing vinyl monomers {dialkyl (C1-C4) aminoalkyl (C2-C6)(meth)acrylates [such as dimethylaminoethyl(meth)acrylate and diethylaminoethyl(meth)acrylate], dialkyl (C1-C4) aminoalkyl (C2-C6)(meth)acrylamides [such as dimethylaminoethyl(meth)acrylamide, diethylaminoethyl(meth)acrylamide, and dimethylaminopropyl(meth)acrylamide]}; tertiary amino group-containing aromatic vinyl-based monomers [such as N,N-dimethylaminostyrene]; nitrogen-containing-heterocyclic ring-containing vinyl-based monomers [such as morpholinoethyl(meth) acrylate, 4-vinylpyridine, 2-vinylpyridine, N-vinylpyrrole, N-vinylpyrrolidone, and N-vinylthiopyrrolidone], and hydrochlorides, sulfates, phosphates, or lower alkyl (C1-C8) monocarboxylic acid (such as acetic acid and propionic acid) salts of these monomers.

(c4) Quaternary Ammonium Base-Containing Vinyl Monomer

Examples include those obtained by quaternizing the tertiary amino group-containing vinyl monomer using a quaternizing agent (such as C1-C12 alkyl chloride, dialkyl sulfuric acid, dialkyl carbonate, or benzyl chloride). Specific examples include alkyl(meth)acrylate quaternary ammonium salts [such as (meth)acryloyloxyethyltrimethylammonium chloride, (meth)acryloyloxyethyltriethylammonium chloride, (meth)acryloyloxyethyldimethylbenzylammonium chloride, and (meth)acryloyloxyethylmethylmorpholinoammonium chloride]; alkyl(meth)acrylamide quaternary ammonium salts [such as (meth)acryloylaminoethyltrimethylammonium chloride, (meth)acryloylaminoethyltriethylammonium chloride, and (meth)acryloylaminoethyldimethylbenzylammonium chloride]; other quaternary ammonium base-containing vinyl-based monomers (such as dimethyldiallylammonium methylsulfate, and trimethylvinylphenylammonium chloride).

(c5) Amphoteric Vinyl Monomer

Examples include N-(meth)acryloyloxy(or amino)alkyl (C1-C10)-N,N-dialkyl(C1-C5)ammonium-N-alkyl(C1-C5) carboxylate (or sulfate) [such as N-(meth)acryloyloxyethyl-N,N-dimethyl ammonium-N-methyl carboxylate, N-(meth) acryloylaminopropyl-N,N-dimethyl ammonium-N-methyl carboxylate, and N-(meth)acryloyloxyethyl-N,N-dimethyl ammonium propyl sulfate].

(c6) Nitrile Group-Containing Monomer

Examples include (meth)acrylonitrile.

(d) Aliphatic Hydrocarbon-Based Vinyl Monomer

Examples include C2-C20 alkenes (such as ethylene, propylene, butene, isobutylene, pentene, heptene, diisobutylene, octene, dodecene, and octadecene) and C4-C12 alkadienes (such as butadiene, isoprene, 1,4-pentadiene, 1,6-heptadiene, and 1,7-octadiene).

(e) Alicyclic Hydrocarbon-Based Vinyl Monomer

Examples include cyclohexene, (di)cyclopentadiene, pinene, limonene, indene, vinylcyclohexene, and ethylidene bicycloheptene.

(f) Aromatic Hydrocarbon-Based Vinyl Monomer

Examples include styrene, α-methylstyrene, vinyltoluene, 2,4-dimethylstyrene, 4-ethylstyrene, 4-isopropylstyrene, 4-butylstyrene, 4-phenylstyrene, 4-cyclohexylstyrene, 4-benzylstyrene, 4-crotylbenzene, and 2-vinylnaphthalene.

(g) Vinyl Ester

Examples include vinyl esters of C2-C12 saturated fatty acids (such as vinyl acetate, vinyl propionate, vinyl butyrate, and vinyl octanoate).

(h) Vinyl Ketone

Examples include C1-C8 alkyl or aryl vinyl ketone (such as methyl vinyl ketone, ethyl vinyl ketone, and phenyl vinyl ketone).

(i) Epoxy Group-Containing Vinyl Monomer

Examples include glycidyl(meth)acrylate, and glycidyl (meth)allyl ether.

(j) Halogen Element-Containing Vinyl Monomer

Examples include vinyl chloride, vinyl bromide, vinylidene chloride, (meth)allyl chloride, and halogenated styrene (such as dichlorostyrene).

(k) Unsaturated Polycarboxylic Acid Ester

Examples include alkyl, cycloalkyl, and aralkyl esters of unsaturated polycarboxylic acids [such as C1-C8 alkyl diesters (dimethyl maleate, dimethyl fumarate, diethyl maleate, and dioctyl maleate) of unsaturated dicarboxylic acids (such as maleic acid, fumaric acid, and itaconic acid)].

(l) Hydroxyl Group-Containing Vinyl Monomer

Examples include hydroxyl-group-containing aromatic vinyl monomers (such as p-hydroxystyrene), hydroxyalkyl (C2-C6)(meth)acrylates [such as 2-hydroxyethyl(meth) acrylate, 2- or 3-hydroxypropyl(meth)acrylate], mono- or di-hydroxyalkyl (C1-C4) substituted(meth)acrylamides [such as N,N-dihydroxymethyl(meth)acrylamide, N,N-dihydroxypropyl(meth)acrylamide, and N,N-di-2-hydroxybutyl(meth)acrylamide], vinyl alcohol, C3-C12 alkenols [such as (meth)allyl alcohol, crotyl alcohol, isocrotyl alcohol, 1-octenol, and 1-undecenol], C4-C12 alkenediols [such as 1-butene-3-ol, 2-butene-1-ol, and 2-butene-1,4-diol], hydroxyalkyl (C1-C6) alkenyl (C3-C10) ethers (such as 2-hydroxyethyl propenyl ether), alkenyl (C3-C10) ethers of polyhydric (trihydric to octahydric) alcohols (such as glycerin, pentaerythritol, sorbitol, sorbitan, diglycerin, sugars, and sucrose), and (meth)acrylates [such as (meth)allyl ether of sucrose].

(m) Examples of the Ionizable Group-Containing Vinyl monomer include an anionic group-containing vinyl monomer (m1), a sulfonic acid group-containing vinyl monomer (m2), a sulfuric acid ester group-containing vinyl monomer (m3), and a phosphoric acid group-containing vinyl monomer (m4).

(m1) Anionic Group-Containing Vinyl Monomer

Examples include monocarboxylic acid group-containing vinyl monomers {such as unsaturated monocarboxylic acids [such as (meth)acrylic acid, α-methyl(meth)acrylic acid, crotonic acid, and cinnamic acid], monoalkyl (C1-C8) esters of unsaturated dicarboxylic acids (such as maleic acid monoalkyl ester, fumaric acid monoalkyl ester, and itaconic acid monoalkyl ester}; dicarboxylic acid group-containing vinyl monomers (such as maleic acid, fumaric acid, itaconic acid, and citraconic acid).

(m2) Sulfonic Acid Group-Containing Vinyl Monomer

Examples include C2-C6 alkene sulfonic acids [vinyl sulfonic acid and (meth)allylsulfonic acid], C6-C12 aromatic vinyl group-containing sulfonic acids [such as α-methylstyrenesulfonic acid], sulfonic acid group-containing (meth)acrylic ester-based monomers [such as sulfopropyl(meth)acrylate, and 2-(meth)acryloyloxyethanesulfonic acid], sulfonic acid group-containing (meth)acrylamide-based monomers [such as 2-(meth)acrylamide-2-methylpropanesulfonic acid], vinyl monomers containing a sulfonic acid group and a hydroxy group [such as 3-(meth)acrylamide-2-hydroxypropanesulfonic acid, 3-allyloxy-2-hydroxypropanesulfonic acid, 3-(meth)-acryloyloxy-2-hydroxypropanesulfonic acid], and alkyl (C3-C18) allylsulfosuccinic acid esters [such as dodecyl allyl sulfosuccinic acid ester].

(m3) Sulfuric Acid Ester Group-Containing Vinyl Monomer

Examples include sulfuric acid esters of poly (n=2 to 30) oxyalkylene (such as oxyethylene, oxypropylene, and oxy-butylene: the addition form may be any of single, random or block addition) mono(meth)acrylates, and sulfuric acid esters of poly (degree of polymerization: 2 to 30) oxyalkylene (oxyethylene, oxypropylene, and oxybutylene: the addition form may be any of single, random or block addition) bisphenol A mono(meth)acrylates.

(m4) Phosphoric Acid Group-Containing Vinyl Monomer

Examples include (meth)acryloyloxyalkyl (C2-C6) phosphate monoester [such as (meth)acryloyloxyethyl phosphate] and (meth)acryloyloxy phosphonic acid [such as 2-acryloyl oxyethyl phosphonic acid].

The mass ratio of the monomer (a) constituting the copolymer (A) is preferably 2 to 99 mass %, more preferably 2 to 55 mass %, still more preferably 5 to 40 mass %, particularly preferably 10 to 30 mass %, based on the total mass of the monomers constituting the copolymer (A), from the viewpoint of solubility in the oxygen atom-containing base oil (B) and solubility in the refrigerant (C).

The mass ratio of the monomer (b) constituting the copolymer (A) is preferably 1 to 98 mass %, more preferably 10 to 98 mass %, still more preferably 30 to 95 mass %, particularly preferably 30 to 90 mass %, most preferably 70 to 90 mass %, based on the total mass of the monomers constituting the copolymer (A), from the viewpoint of solubility in the oxygen atom-containing base oil (B).

In the copolymer (A), the mass ratio of the monomer (b) represented by the formula (2) in which $R^5$ is a C1-C4 alkyl group is preferably 10 to 98 mass %, more preferably 10 to 90 mass %, still more preferably 30 to 90 mass %, particularly preferably 50 to 90 mass %, most preferably 70 to 90 mass %, based on the total mass of the monomers constituting the copolymer (A), from the viewpoint of solubility in the refrigerant (C).

The total mass ratio of the monomer (a) and the monomer (b) constituting the copolymer (A) is preferably 50 to 100 mass %, more preferably 80 to 100 mass %, particularly preferably 90 to 100 mass %, based on the total mass of the monomers constituting the copolymer (A), from the viewpoint of solubility in the oxygen atom-containing base oil (B) and solubility in the refrigerant (C).

The total mass ratio of the monomers (c) to (m) constituting the copolymer (A) is preferably 50 mass % or less, more preferably 20 mass % or less, particularly preferably 10 mass % or less, based on the total mass of the monomers constituting the copolymer (A), from the viewpoint of solubility in the oxygen atom-containing base oil (B) and solubility in the refrigerant (C).

In the present invention, the mass ratio (b/a) of the monomer (b) to the monomer (a) in the monomers constituting the copolymer (A) is 0.01 to 42. From the viewpoint of the viscosity index improving effect, the mass ratio is preferably 0.1 to 40, more preferably 0.5 to 20, particularly preferably 0.8 to 10.

When the mass ratio is less than 0.01, the solubility in the oxygen atom-containing base oil (B) is poor, and when the mass ratio is more than 42, the solubility in the refrigerant (C) is poor.

The SP value of the copolymer (A) is 8.1 to 10.0 (cal/cm$^3$)$^{1/2}$. From the viewpoints of the viscosity index improving effect, the solubility in the oxygen atom-containing base oil (B), and the solubility in the refrigerant (C), the SP value is preferably 8.5 to 9.8 (cal/cm$^3$)$^{1/2}$, more preferably 8.8 to 9.5 (cal/cm$^3$)$^{1/2}$.

When the SP value of the copolymer (A) is less than 8.1, the solubility in the oxygen atom-containing base oil (B) is poor. When the SP value is more than 10.0, the solubility in the oxygen atom-containing base oil (B) and the solubility in the refrigerant (C) are poor.

The SP value of the copolymer (A) is a value obtained by calculating the SP value of each of the monomer units (structure in which carbon-carbon double bonds react to form a single bond) constituting the copolymer (A) by the above-described method and arithmetically averaging the SP values of the monomers based on the mass fraction of the constituent monomer units.

For example, in the case of a copolymer containing, as constituent monomers, 20 mass % of 2,2,2-trifluoroethyl methacrylate (SP value of a constituent unit: 8.66) and 80 mass % of n-butyl methacrylate (SP value of a constituent unit: 9.45), the SP value can be calculated as follows.

$$SP \text{ value of copolymer} = (8.66 \times 20 + 9.45 \times 80)/100 = 9.29$$

The weight-average molecular weight of the copolymer (A) is preferably 1,000 to 2,000,000, more preferably 1,000 to 1,000,000, particularly preferably 1,000 to 500,000, from the viewpoint of solubility in the oxygen atom-containing base oil (B) and solubility in the refrigerant (C).

In the present invention, the weight-average molecular weight (hereinafter, abbreviated as "Mw") and the number average molecular weight (hereinafter, abbreviated as "Mn") can be measured by gel permeation chromatography (hereinafter, abbreviated as "GPC") under the following conditions.

Measurement Conditions of Mw and Mn

Device: "HLC-8320GPC" [manufactured by Tosoh Corporation]
Column: "TSKgel GMHXL" [manufactured by Tosoh Corporation] two columns
"TSKgel Multipore $H_{XL}$-M" [manufactured by Tosoh Corporation] one column
Measurement temperature: 40° C.
Sample solution: 0.25 mass % tetrahydrofuran solution
Volume of solution injected: 10.0 µl
Detection device: Refractive index detector
Reference material: Standard polystyrene (TS reference material: standard polystyrene (TSKstandard POLYSTYRENE))
12 samples (molecular weight: 589, 1,050, 2,630, 9,100, 19,500, 37,900, 96,400, 190,000, 355,000, 1,090,000, 2,110,000, 4,480,000) [manufactured by Tosoh Corporation]

The copolymer (A) can be obtained by a known production method. Specific examples include a method in which the monomer formulation is solution-polymerized in a solvent in the presence of a polymerization catalyst.

Examples of the solvent include toluene, xylene, alkyl (C3-C10) benzene, methyl ethyl ketone, and polymerized oils {such as oxygen atom-containing base oil (B)(e.g. at least one selected from the group consisting of an ester oil (B1), a polyvinyl ether (B2), and a polyalkylene glycol (B3)), and mineral oils}. Among these solvents, the oxygen atom-containing base oil (B) is preferable from the viewpoint of the handleability of the viscosity index improver and the compatibility with the refrigerant (C) as well as the step for removing the solvent can be omitted.

Examples of the polymerization catalyst include azo catalysts (such as azobisisobutyronitrile and azobisvaleronitrile) and peroxide catalysts (such as benzoyl peroxide, cumyl peroxide, and lauryl peroxide). As the polymerization catalyst, 2,2'-azobis(2,4-dimethylvaleronitrile) may be used.

A chain transfer agent (such as C2-C20 alkyl mercaptans) can also be used, if necessary.

The polymerization temperature is preferably 50° C. to 140° C., more preferably 70° C. to 120° C. The copolymer (A) can be obtained by bulk polymerization, emulsion polymerization, or suspension polymerization other than the solution polymerization.

The polymerization form of the copolymer (A) may be either a random addition polymer or an alternating copolymer, or may be either a graft copolymer or a block copolymer.

The Mw of the copolymer (A) can be adjusted by adjusting polymerization conditions such as the temperature at the time of polymerization, the monomer concentration (solvent concentration), the amount of catalyst, or the amount of chain transfer agent.

The viscosity index improver of the present invention only needs to contain the copolymer (A), and may contain the oxygen atom-containing base oil (B). Preferably, the viscosity index improver contains the oxygen atom-containing base oil (B) from the viewpoint of handleability of the viscosity index improver and compatibility with the refrigerant (C).

As the oxygen atom-containing base oil (B), it is possible to use an oxygen atom-containing base oil having a lubricating function, which has been typically used as a lubricating oil. Examples of the oxygen atom-containing base oil include an ester oil (B1), a polyvinyl ether (B2), and a polyalkylene glycol (B3). Among these materials, the ester oil (B1) is preferable from the viewpoint of handleability of the viscosity index improver and compatibility with the refrigerant (C).

Examples of the ester oil (B1) include a monoester (B11) of monohydric alcohol (x1) and monovalent carboxylic acid (y1), and a polyol ester (B12). Examples of the polyol ester (B12) include a diester (B12-1) of monohydric alcohol (x1) and divalent carboxylic acid (y2), and a polyol ester (B12-2) of polyhydric (dihydric to decahydric) alcohol (x2) and monovalent carboxylic acid (y1). Among these, the ester oil (B1) is preferably the monoester (B11) of monohydric alcohol (x1) and monovalent carboxylic acid (y1) and/or polyol ester (B12), more preferably the monoester (B11) of monohydric alcohol (x1) and monovalent carboxylic acid (y1) and/or the polyol ester (B12-2) of polyhydric (dihydric to decahydric) alcohol (x2) and monovalent carboxylic acid (y1), particularly preferably the polyol ester (B12-2) of polyhydric (dihydric to decahydric) alcohol (x2) and monovalent carboxylic acid (y1), from the viewpoint of compatibility with the refrigerant (C). In the polyol ester (B12-2) of polyhydric (dihydric to decahydric) alcohol (x2) and monovalent carboxylic acid (y1), the polyol ester may be a complete ester in which all hydroxyl groups of the polyhydric alcohol are esterified, or may be a partial ester in which some of hydroxyl groups remain. Preferably, the polyol ester is a complete ester. The polyol ester (B12-2) of polyhydric (dihydric to decahydric) alcohol (x2) and monovalent carboxylic acid (y1) tends to be less likely to precipitate at a low temperature as the polyol ester is a complete ester and has a smaller hydroxyl value.

Examples of the monohydric alcohol (x1) include C1-C24 saturated aliphatic monoalcohols [linear saturated aliphatic monoalcohols {such as methanol, ethanol, n-propanol, n-butanol, n-pentanol, n-hexanol, n-heptanol, n-octanol, n-nonanol, n-decanol, n-undecyl alcohol, n-dodecyl alcohol, n-tridecyl alcohol, n-tetradecyl alcohol, n-pentadecyl alcohol, n-hexadecyl alcohol, n-heptadecyl alcohol, n-octadecyl alcohol, n-nonadecyl alcohol, n-eicosyl alcohol, n-heneicosyl alcohol, n-docosyl alcohol, and n-tetracosyl alcohol}, branched saturated aliphatic monoalcohols {such as 2-ethylhexanol, 3,5,5-trimethyl-1 hexanol, isononanol, isodecanol, isoundecyl alcohol, isododecyl alcohol, isotridecyl alcohol, isotetradecyl alcohol, isopentadecyl alcohol, isohexadecyl alcohol, isoheptadecyl alcohol, isooctadecyl alcohol, and isononadecyl alcohol}, alicyclic monoalcohols {such as cyclohexanol, 2-, 3-, or 4-t-butylcyclohexanol, menthol, cyclohexaneethanol, and 2-, 3-, or 4-isopropylcyclohexanol}], linear unsaturated aliphatic monoalcohols, branched unsaturated aliphatic monoalcohols, alicyclic unsaturated monoalcohols, and C7-C24 aromatic ring-containing monoalcohols {such as benzyl alcohol}.

Among them, C4-C16 linear or branched saturated aliphatic monoalcohols are preferable, C4-C10 linear or branched saturated aliphatic monoalcohols are more preferable, C4-C8 linear or branched saturated aliphatic monoalcohols are particularly preferable, and C4-C8 branched saturated aliphatic monoalcohols are most preferable, from the viewpoint of low-temperature viscosity, kinematic viscosity at 40° C., and compatibility with the refrigerant (C).

Examples of the polyhydric alcohol (x2) include C2-C24 saturated aliphatic diols [linear saturated aliphatic diols {such as ethylene glycol, propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, and 1,16-hexadecanediol}, branched saturated aliphatic diols {such as 2-methyl-1,3-propanediol, 2-methyl-1,4-butanediol, 1,2-butanediol, neopentyl glycol, 1,2-pentanediol, 1,2-hexanediol, 3-methyl-1,5-pentanediol, 1,2-heptanediol, 1,2-octanediol, 1,2-nonanediol, 1,2-decanediol, 1,2-undecanediol, 1,2-dodecanediol, 1,2-tridecanediol, 1,2-tetradecanediol, 1,2-pentadecanediol, and 1,2-hexadecanediol}, C4-C24 polyalkylene glycols {such as diethylene glycol and triethylene glycol}], C2-C24 unsaturated aliphatic diols, C3-C24 saturated aliphatic polyhydric (trihydric or higher) alcohols [C3-C24 trivalent saturated aliphatic alcohols {such as glycerin, trimethylolethane, and trimethylolpropane}, C4-C24 tetravalent saturated aliphatic alcohols {such as pentaerythritol, xylitol, and ditrimethylolpropane}, pentahydric or higher alcohols {such as sorbitol, dipentaerythritol, trimethylolpropane, disorbitol, and trisorbitol}, alicyclic diols {such as 1,2-, 1,3- or 1,4-cyclohexanediol}], C3-C24 unsaturated aliphatic polyhydric (trihydric or higher) alcohols, and C8-C24 aromatic ring-containing dihydric alcohols {such as an ethylene oxide adduct of dihydroxybenzene}.

Among them, C2-C24 linear or branched saturated aliphatic diols or C3-C24 saturated aliphatic polyhydric (trihydric or higher) alcohols are preferable, C2-C10 linear or branched saturated aliphatic diols or C3-C10 saturated aliphatic polyhydric (trihydric or higher) alcohols are more preferable, and C4-C8 linear or branched saturated aliphatic diols or C4-C8 saturated aliphatic polyhydric (trihydric or higher) alcohols are particularly preferable, from the viewpoint of low-temperature viscosity, kinematic viscosity at 40° C., and compatibility with the refrigerant (C).

Examples of the monovalent carboxylic acid (y1) include C2-C25 saturated aliphatic monovalent carboxylic acids [linear saturated aliphatic monovalent carboxylic acids {such as n-propanoic acid, n-butanoic acid, n-pentanoic acid, n-hexanoic acid, n-heptanoic acid, n-octanoic acid, n-nonanoic acid, n-decanoic acid, n-undecanoic acid, n-dodecanoic acid, n-tridecanoic acid, n-tetradecanoic acid, n-pentadecanoic acid, n-hexadecanoic acid, n-heptadecanoic acid, n-octadecanoic acid, n-nonadecanoic acid, eicosanoic acid, docosanoic acid, and tetracosanoic acid}, C2-C25 branched saturated aliphatic monovalent carboxylic acids {such as 2-ethylhexanoic acid, 3,5,5-trimethylhexanoic acid, isononanoic acid, isodecanoic acid, isoundecanoic acid, isododecanoic acid, isotridecanoic acid, isotetradecanoic acid, isopentadecanoic acid, isohexadecanoic acid, isoheptadecanoic acid, isooctadecanoic acid, and isononadecanoic acid}, alicyclic monovalent carboxylic acids {such as cyclohexanecarboxylic acid}], C2-C25 unsaturated aliphatic monovalent carboxylic acids, and aromatic ring-containing monovalent carboxylic acids {such as benzoic acid}.

Among them, C2-C25 aliphatic monovalent carboxylic acids are preferable, C2-C24 linear or branched saturated aliphatic monovalent carboxylic acids are more preferable, and C4-C14 linear or branched saturated aliphatic monovalent carboxylic acids are particularly preferable, from the viewpoint of low-temperature viscosity, kinematic viscosity at 40° C., and compatibility with the refrigerant (C).

Examples of the divalent carboxylic acid (y2) include C2-C24 saturated aliphatic divalent carboxylic acids [such as linear saturated aliphatic divalent carboxylic acids {such as ethanedioic acid (oxalic acid), propanedioic acid (malonic acid), n-butanedioic acid (succinic acid), n-heptanedioic acid (glutaric acid), n-hexanedioic acid (adipic acid), n-heptanedioic acid, n-octanedioic acid, n-nonanedioic acid (azelaic acid), n-decanedioic acid (sebacic acid), n-undecanedioic acid, n-dodecanedioic acid, n-tridecanedioic acid, n-tetradecanedioic acid, n-pentadecanedioic acid, and n-hexadecanedioic acid}, branched saturated aliphatic divalent carboxylic acids {such as 2-methylglutaric acid, 3-methylglutaric acid, and 3-methyladipic acid}, alicyclic saturated divalent carboxylic acids {such as 1,2- or 1,3-cyclopentanedicarboxylic acid, and 1,2-, 1,3- or 1,4-cyclohexanedicarboxylic acid}], C2-C24 unsaturated aliphatic divalent carboxylic acids {such as maleic acid and fumaric acid}, and C8-C24 aromatic ring-containing divalent carboxylic acids {such as phthalic acid, isophthalic acid, and terephthalic acid}.

Among them, C2-C24 aliphatic divalent carboxylic acids are preferable, C2-C24 linear or branched aliphatic divalent carboxylic acids are more preferable, and C4-C10 linear or branched aliphatic divalent carboxylic acids are particularly preferable, from the viewpoint of low temperature viscosity, kinematic viscosity at 40° C., and compatibility with the refrigerant (C).

From the viewpoint of low-temperature viscosity and compatibility with the refrigerant (C), the ester oil (B1) is preferably an ester of a saturated aliphatic alcohol (at least one selected from the group consisting of saturated aliphatic monoalcohols, saturated aliphatic diols, and saturated aliphatic polyhydric alcohols) and a saturated aliphatic carboxylic acid (saturated aliphatic monovalent carboxylic acid and/or saturated aliphatic divalent carboxylic acid), more preferably an ester of a branched saturated aliphatic alcohol (branched saturated aliphatic monoalcohol and/or branched saturated aliphatic diol) and a branched saturated aliphatic carboxylic acid (branched saturated aliphatic monovalent carboxylic acid and/or branched saturated aliphatic divalent carboxylic acid), particularly preferably an ester of a C4-C10 branched saturated aliphatic alcohol and a C4-C10 branched saturated aliphatic carboxylic acid.

The ester oil (B1) is preferably C20-C45 ester, more preferably C20-C40 ester, from the viewpoint of compatibility with the refrigerant (C).

The ester oil (B1) is preferably C10-C40 ester, more preferably C10-C25 ester, from the viewpoint of viscosity index improving effect by the copolymer (A). The number of carbon atoms is set within these ranges, the molecular weight does not become too large, and the viscosity index improving effect by the copolymer (A) becomes large.

Examples of the polyvinyl ether (B2)(hereinafter, abbreviated as "PVE" in some cases) include polymers having one or more constituent units derived from vinyl ether.

Preferably, PVE has a structural unit represented by the following formula (3).

[Formula 5]

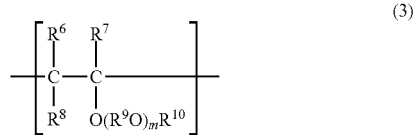

(3)

In the formula, $R^6$, $R^7$, or $R^8$ may be the same as or different from each other and each represent a hydrogen atom or a hydrocarbon group, $R^9$ represents a divalent hydrocarbon group or a divalent ether-bonded oxygen-containing hydrocarbon group, $R^{10}$ represents a hydrocarbon group, and m represents an integer of 0 or more. Each $R^9$ may be the same as or different from each other when m is 2 or greater.

The number of carbon atoms of the hydrocarbon group represented by $R^6$, $R^7$, and $R^8$ in the formula (3) is preferably 1 to 8, more preferably 2 to 7, still more preferably 3 to 6. Further, at least one of $R^6$, $R^7$, or $R^1$ in the formula (3) is preferably a hydrogen atom, and all of $R^6$, $R^7$, and $R^8$ are more preferably hydrogen atoms.

The number of carbon atoms of the divalent hydrocarbon group and the ether-bonded oxygen-containing hydrocarbon group represented by $R^9$ in the formula (3) is preferably 1 to 10, more preferably 2 to 8, still more preferably 3 to 6. The divalent ether-bonded oxygen-containing hydrocarbon group represented by $R^9$ in the formula (3) may be, for example, a hydrocarbon group having an oxygen forming an ether bond on a side chain.

$R^{10}$ in the formula (3) is preferably a C1-C20 hydrocarbon group. Examples of the hydrocarbon group include an alkyl group, a cycloalkyl group, a phenyl group, an aryl group, and an arylalkyl group. Among these groups, an alkyl group is preferable, and a C1-C5 alkyl group is more preferable.

m in the formula (3) is preferably 0 to 20, more preferably 1 to 18, still more preferably 2 to 16. Further, the average value of m in all structural units constituting the polyvinyl ether (B2) is preferably 0 to 10.

In the present invention, the polyvinyl ether (B2) may be a homopolymer composed of one selected from the structural units represented by the formula (3), may be a copolymer composed of two or more selected from the structural units represented by the formula (3), or may be a copolymer composed of the structural unit represented by the formula (3) and another structural unit. The polyvinyl ether (B2) is used as a copolymer, as a result of which the lubricity, insulation properties, moisture absorbency, and the like can be further improved while satisfying the compatibility of the refrigerating machine oil with the refrigerant (C). At this time, the type of raw material: monomer, the type of initiator, the ratio of structural units in the copolymer, and the like are appropriately selected, and thus various characteristics of the refrigerating machine oil are made desired. Therefore, it is possible to freely obtain a refrigerating machine oil meeting the demands for lubricity and compatibility, that differ depending on the model of compressor in the refrigeration system or air-conditioning system, the material and refrigerating performance of the lubricating sections, and the type of refrigerant. The copolymer may be either a block copolymer or a random copolymer.

In the present invention, when the polyvinyl ether (B2) is a copolymer, the copolymer preferably includes a structural unit (3-1) represented by the formula (3) above in which $R^{10}$ is a C1-C2 alkyl group, and a structural unit (3-2) represented by the formula (3) above in which $R^{10}$ is a C3-C20 alkyl group, preferably a C3-C10 alkyl group, more preferably a C3-C8 alkyl group. $R^{10}$ in the structural unit (3-1) is particularly preferably an ethyl group, and $R^{10}$ in the structural unit (3-2) is particularly preferably an isobutyl group. Further, in the present invention, when the polyvinyl ether (B2) is a copolymer containing the structural units (3-1) and (3-2), a molar ratio of the structural unit (3-1) to the structural unit (3-2) is preferably 5:95 to 95:5, more preferably 20:80 to 90:10, still more preferably 70:30 to 90:10. When the molar ratio is within the above range, there is a tendency that the compatibility with the refrigerant (C) can be further improved, and the moisture absorbency can be lowered.

There is a case where a side reaction is caused to form an unsaturated group such as an aryl group in the molecule in the production process of the polyvinyl ether (B2) in the present invention; however, the polyvinyl ether (B2) in the present invention is preferably a polyvinyl ether in which the unsaturation degree derived from an unsaturated group or the like is low, from the viewpoint of improving thermal stability of polyvinyl ether itself, suppressing sludge formation due to polymer formation, and suppressing peroxide formation due to a decrease in antioxidant properties (oxidation inhibiting properties). The unsaturation degree of the polyvinyl ether (B2) is preferably 0.04 meq/g or less, more preferably 0.03 meq/g or less, still more preferably 0.02 meq/g or less. The peroxide value of the polyvinyl ether (B2) is preferably 10.0 meq/kg or less, more preferably 5.0 meq/kg or less, still more preferably 1.0 meq/kg. The carbonyl value of the polyvinyl ether (B2) is preferably 100 ppm by mass or less, more preferably 50 ppm by mass or less, still more preferably 20 ppm by mass or less. The hydroxyl value of the polyvinyl ether (B2) is preferably 10 mgKOH/g or less, more preferably 5 mgKOH/g or less, still more preferably 3 mgKOH/g or less.

The unsaturation degree, peroxide value, and carbonyl value in the present invention indicate values measured by The JOCS Standard Methods for the Analysis of Fats, Oils and Related materials, edited by Japan Oil Chemists' Society. That is, the unsaturation degree in the present invention indicates a value (meq/g) obtained by reacting a sample with a Wijs solution (ICl-acetic acid solution), allowing the sample to stand in a dark place, then reducing the excess ICl to iodine, titrating the iodine portion with sodium thiosulfate, calculating the iodine value, and converting the iodine value to vinyl equivalent. Further, the peroxide value in the present invention indicates a value (meq/kg) obtained by adding potassium iodide to a sample, titrating the produced free iodine with sodium thiosulfate, and converting the free iodine to milliequivalent per kg of sample. Furthermore, the carbonyl value in the present invention indicates a value (ppm by mass) obtained by reacting a sample with 2,4-dinitrophenylhydrazine to form chromogenic quinoid ions, measuring the absorbance of this sample at 480 nm, and converting the absorbance to carbonyl content based on a calibration curve previously obtained using a standard substance: cinnamaldehyde.

The polyalkylene glycol (B3) has various chemical structures, and base compounds thereof include polyethylene glycol, polypropylene glycol, and polybutylene glycol. The unit structure of the polyalkylene glycol (B3) is oxyethylene, oxypropylene, or oxybutylene. The polyalkylene glycol (B3) can be obtained by ring-opening polymerization using, as raw materials, monomers: ethylene oxide, propylene oxide, and butylene oxide, respectively.

The polyalkylene glycol (B3) is, for example, a compound represented by the following formula (11).

$$R^\alpha-[(OR^\beta)_f-OR^\gamma]_g \quad (11)$$

In the formula (11), $R^\alpha$ represents a hydrogen atom, a C1-C10 alkyl group, a C2-C10 acyl group, or a residue of a compound having 2 to 8 hydroxyl groups, $R^\beta$ represents a C2-C4 alkylene group, $R^\gamma$ represents a hydrogen atom, a C1-C10 alkyl group, or a C2-C10 acyl group, f represents an integer from 1 to 80, and g represents an integer from 1 to 8.

In the formula (11) above, the alkyl group represented by $R^\alpha$ or $R^\gamma$ may be any of a linear alkyl group, a branched alkyl group, and a cyclic alkyl group. The number of carbon atoms in the alkyl group is preferably 1 to 10, more preferably 1 to 6. When the number of carbon atoms in the alkyl group is more than 10, the compatibility with the refrigerant (C) tends to decrease.

The alkyl group moiety of the acyl group represented by $R^\alpha$ or $R^\gamma$ may be linear, branched, or cyclic. The number of carbon atoms in the acyl group is preferably 2 to 10, more preferably 2 to 6. When the number of carbon atoms in the acyl group is more than 10, the compatibility with the refrigerant (C) decreases, and phase separation may occur.

When groups represented by $R^\alpha$ and $R^\gamma$ are both alkyl groups or are both acyl groups, the groups represented by $R^\alpha$ and $R^\gamma$ may be the same as or different from each other. Further, when g is 2 or greater, groups represented by each $R^\alpha$ and each $R^\gamma$ in the same molecule may be the same as or different from each other.

When the group represented by $R^\alpha$ is a residue of a compound having C2-C8 hydroxyl groups, the compound may be a chain compound or a cyclic compound.

Among the polyalkylene glycols represented by the formula (11) above, at least one of $R^\alpha$ or $R^\gamma$ is preferably an alkyl group (more preferably a C1-C4 alkyl group), particularly preferably a methyl group, from the viewpoint of compatibility with the refrigerant (C).

Furthermore, from the viewpoint of thermal and chemical stability, both $R^\alpha$ and $R^\gamma$ are preferably alkyl groups (more preferably C1-C4 alkyl groups). Particularly, both $R^\alpha$ and $R^\gamma$ are preferably methyl groups.

From the viewpoint of ease of production and cost, it is preferable that one of $R^\alpha$ and $R^\gamma$ is an alkyl group (more preferably a C1-C4 alkyl group) and the other is a hydrogen atom. Particularly, it is preferable that one of $R^\alpha$ and $R^\gamma$ is a methyl group and the other is a hydrogen atom. From the viewpoint of lubricity and sludge solubility, both $R^\alpha$ and $R^\gamma$ are preferably hydrogen atoms.

$R^\beta$ in the formula (11) above represents a C2-C4 alkylene group, and specific examples of the alkylene group include an ethylene group, a propylene group, and a butylene group. Examples of the oxyalkylene group of the repeating unit represented by $OR^\beta$ include an oxyethylene group, an oxypropylene group, and an oxybutylene group.

The oxyalkylene groups in the same molecule may be the same as each other, or two or more oxyalkylene groups may be contained.

As the polyalkylene glycol represented by the formula (11) above, a copolymer including an oxyethylene group (EO) and an oxypropylene group (PO) is preferable from the viewpoint of compatibility with the refrigerant (C) and viscosity-temperature characteristics. In such a case, the proportion of the oxyethylene group in the total of the oxyethylene group and the oxypropylene group (EO/(PO+EO)) is preferably in a range of 0.1 to 0.8, more preferably in a range of 0.3 to 0.6, from the viewpoint of baking load and viscosity-temperature characteristics.

From the viewpoint of moisture absorbency and thermal/oxidation stability, the value of EO/(PO+EO) is preferably in a range of 0 to 0.5, more preferably in a range of 0 to 0.2, most preferably 0 (i.e. a propylene oxide homopolymer).

f in the formula (11) represents the number of repetitions (degree of polymerization) of the oxyalkylene group $OR^\beta$ and is an integer from 1 to 80. g is an integer from 1 to 8. For example, when $R^\alpha$ is an alkyl or acyl group, g is 1. When $R_\alpha$ is a residue of a compound having 2 to 8 hydroxyl groups, g is the number of hydroxyl groups of the compound.

The product (f×g) of f and g is not limited, but the average value of f×g is preferably 6 to 80 in order to satisfy the required performance as the refrigerating machine oil in a well-balanced manner.

The number average molecular weight of the polyalkylene glycol represented by the formula (11) is preferably 500 to 3000, more preferably 600 to 2000, still more preferably 600 to 1500. Preferably, n is such a number that the number average molecular weight of the polyalkylene glycol satisfies the above conditions. When the number average molecular weight of the polyalkylene glycol is too low, lubricity in the coexistence of the refrigerant (C) tends to be insufficient. On the other hand, when the number average molecular weight is too high, the composition range exhibiting compatibility with the refrigerant (C) under low temperature conditions is narrowed, and this tends to cause poor lubrication of a refrigerant compressor and inhibition of heat exchange in an evaporator.

The hydroxyl value of the polyalkylene glycol (B3) is not limited. Desirably, the value is 100 mgKOH/g or less, preferably 50 mgKOH/g or less, more preferably 30 mgKOH/g or less, most preferably 10 mgKOH/g or less.

In the present invention, the polyalkylene glycol (B3) can be synthesized using a known method ("Alkylene Oxide Polymer", Mitsuta Shibata et al., published by KAIBUNDO PUBLISHING CO., LTD., Nov. 20, 1990). For example, one or more types of predetermined alkylene oxides are addition polymerized with an alcohol ($R^\alpha OH$; $R^\alpha$ represents the same meaning as defined in $R^\alpha$ in the formula (11) above), and a terminal hydroxyl group is etherified or esterified to obtain the polyalkylene glycol represented by the formula (11) above. When two or more types of alkylene oxides are used in the above production process, the resulting polyalkylene glycol may be either a random copolymer or a block copolymer, but is preferably a block copolymer because of tendency of being more excellent in oxidation stability and lubricity, and is preferably a random copolymer because of tendency of being more excellent in low-temperature fluidity.

The kinematic viscosity at 100° C. of the polyalkylene glycol (B3) is preferably 5 to 20 mm²/s, preferably 6 to 18 mm²/s, more preferably 7 to 16 mm²/s, still more preferably 8 to 15 mm²/s, most preferably 10 to 15 mm²/s, from the viewpoint of lubricity of the refrigerating machine oil and compatibility with the refrigerant (C). The kinematic viscosity at 40° C. of the polyalkylene glycol (B3) is preferably 10 to 200 mm²/s, more preferably 20 to 150 mm²/s, from the viewpoint of lubricity of the refrigerating machine oil and compatibility with the refrigerant (C).

The pour point of the polyalkylene glycol represented by the formula (11) is preferably −10° C. or lower, more preferably −20° C. to −50° C. When the polyalkylene glycol having a pour point of −10° C. or higher is used, the refrigerating machine oil tends to be easily solidified in a refrigerant circulation system at a low temperature.

In the process for producing the polyalkylene glycol represented by the formula (11) above, an alkylene oxide such as propylene oxide may cause a side reaction to form an unsaturated group such as an aryl group in the molecule. An unsaturated group is formed in the polyalkylene glycol molecule, as a result of which the following phenomena are likely to occur: the thermal stability of the polyalkylene glycol itself is reduced; a polymer is produced to cause generation of sludge; and the antioxidant properties (oxidation inhibiting properties) deteriorate to cause formation of a peroxide. In particular, when peroxide is produced, the peroxide is decomposed to produce a compound having a carbonyl group, and further the compound having a carbonyl group produces sludge. Thus, capillary clogging is likely to occur.

Therefore, the polyalkylene glycol (B3) in the present invention is preferably a polyalkylene glycol in which the unsaturation degree derived from an unsaturated group or the like is low. Specifically, the unsaturation degree is preferably 0.04 meq/g or less, more preferably 0.03 meq/g or less, most preferably 0.02 meq/g or less. Further, the peroxide value is preferably 10.0 meq/kg or less, more preferably 5.0 meq/kg or less, most preferably 1.0 meq/kg. Furthermore, the carbonyl value is preferably 100 ppm by mass or less, more preferably 50 ppm by mass or less, most preferably 20 ppm by mass or less.

In the present invention, to obtain a polyalkylene glycol with a low unsaturation degree, peroxide value and carbonyl value, reaction temperature when propylene oxide is allowed to react is preferably 120° C. or lower (more preferably 110° C. or lower). When an alkali catalyst is used in the production, an inorganic adsorbent such as activated carbon, activated white earth, bentonite, dolomite, or aluminosilicate is used to remove the alkali catalyst, and thus the unsaturation degree can be reduced. Also, an increase in the peroxide value or carbonyl value can be prevented by, when producing or using the polyalkylene glycol, avoiding contact to oxygen as much as possible, and adding an antioxidant.

In the present invention, the carbon/oxygen molar ratio of the polyalkylene glycol (B3) is preferably in a predetermined range. Selecting and adjusting the type and mixing ratio of raw material monomers makes it possible to produce a polymer having the molar ratio within the above range.

In the present invention, the viscosity index improver may further contain a hydrocarbon-based oil such as a mineral oil, an olefin polymer, a naphthalene compound, or alkyl benzene, in addition to the oxygen atom-containing base oil (B) {such as at least one selected from the group consisting of the ester oil (B1), the polyvinyl ether (B2), and the polyalkylene glycol (B3)}. The total content of the ester oil (B1), the polyvinyl ether (B2), and the polyalkylene glycol (B3) is preferably 5 mass % or more, more preferably 30 mass % or more, still more preferably 95 mass % or more, based on the total amount of the base oils contained in the viscosity index improver.

The kinematic viscosity at 40° C. (measured in accordance with JIS-K 2283) of the oxygen atom-containing base oil (B) in the viscosity index improver is generally 1 to 200 mm²/s. From the viewpoint of the viscosity index improving effect, the kinematic viscosity is preferably 5 to 100 mm²/s, more preferably 7 to 20 mm²/s.

The kinematic viscosity at 100° C. (measured in accordance with JIS-K 2283) of the oxygen atom-containing base oil (B) in the viscosity index improver is generally 1 to 50 mm²/s. From the viewpoint of kinematic viscosity at low temperatures, the kinematic viscosity is preferably 1 to 10 mm²/s, more preferably 1 to 9 mm²/s.

The viscosity index (measured in accordance with JIS-K 2283) of the oxygen atom-containing base oil (B) in the viscosity index improver is generally 0 or more. From the viewpoint of the effect of improving the viscosity index of the lubricating oil composition, the viscosity index is preferably 50 or more, more preferably 50 to 180.

The SP value of the oxygen atom-containing base oil (B) is preferably 8.0 to 10.0 $(\text{cal/cm}^3)^{1/2}$, more preferably 8.4 to 9.5 $(\text{cal/cm}^3)^{1/2}$, from the viewpoint of the solubility of the copolymer (A).

When the viscosity index improver contains two or more types of the oxygen atom-containing base oils (B), preferably, the SP value of each of the oxygen atom-containing base oils (B) in the viscosity index improver is calculated by the method, and the value obtained by arithmetically averaging the SP values of each of the oxygen atom-containing base oils (B) based on the mass fraction is within the above range.

An absolute value of a difference between the SP value of the copolymer (A) and the SP value of the oxygen atom-containing base oil (B) is preferably 2.0 $(\text{cal/cm}^3)^{1/2}$ or less, more preferably 0.1 to 2.0 $(\text{cal/cm}^3)^{1/2}$, still more preferably 0.1 to 1.5 $(\text{cal/cm}^3)^{1/2}$, particularly preferably 0.1 to 1.0 $(\text{cal/cm}^3)^{1/2}$, most preferably 0.1 to 0.65 $(\text{cal/cm}^3)^{1/2}$, from the viewpoints of the viscosity index improving effect, the solubility in the oxygen atom-containing base oil (B), and the solubility in the refrigerant (C).

When the viscosity index improver contains two or more types of the oxygen atom-containing base oils (B), the SP values of the oxygen atom-containing base oils (B) in the viscosity index improver are calculated by the above method, and arithmetically averaged based on the mass fraction to obtain a (averaged) SP value of the oxygen atom-containing base oil (B). The absolute value of a difference between the SP value of the oxygen atom-containing base oil (B) and the SP value of the copolymer (A) is preferably within the above range.

The mass ratio (A/B) of the copolymer (A) and the oxygen atom-containing base oil (B) in the viscosity index improver is generally 99/1 to 1/99. From the viewpoint of viscosity index, the mass ratio is preferably 99/1 to 10/90, more preferably 99/1 to 20/80.

When two or more types are used as the oxygen atom-containing base oil (B), preferably, a value obtained by calculating the SP value of each of the oxygen atom-containing base oils, and arithmetically averaging the calculated values according to the mass ratio satisfies the SP value described above.

The viscosity index improver of the present invention is excellent in solubility in a refrigerant and an oxygen atom-containing base oil, has a high viscosity index improving effect when used in the refrigerating machine oil, and can obtain a refrigerating machine oil having excellent low-temperature characteristics. Thus, the viscosity index improver can be used as a viscosity index improver for refrigerating machine oils, and is extremely useful particularly as a viscosity index improver used in a working fluid composition for refrigerating machines which contains the refrigerant (C) and the refrigerating machine oil.

Refrigerating Machine Oil

The refrigerating machine oil of the present invention contains the lubricant base oil and the viscosity index improver. Here, any base oil generally used for lubricating oils can be used as the lubricant base oil, and it is preferable to use the oxygen atom-containing base oil from the viewpoint of excellent compatibility with both the refrigerant and the viscosity index improver. Hence, the refrigerating machine oil of the present invention preferably contains the oxygen atom-containing base oil. When the viscosity index improver contains the oxygen atom-containing base oil (B), the oxygen atom-containing base oil (B) may be used as it is as the refrigerating machine oil. Further, the oxygen atom-containing base oil (B) or an oxygen atom-containing base oil other than the oxygen atom-containing base oil (B) contained in the viscosity index improver may be contained and used as the refrigerating machine oil.

As the oxygen atom-containing base oil as the lubricant base oil used in the refrigerating machine oil of the present invention, any oxygen atom-containing base oil generally used for lubricating oils can be used. From the viewpoint of use in the refrigerating machine oil, at least one selected from ester and ether is preferable, and at least one selected from the group consisting of the ester oil (B1), the polyvinyl ether (B2), and the polyalkylene glycol (B3) is preferable. One type of each of the ester oil (B1), the polyvinyl ether (B2), and the polyalkylene glycol (B3) may be used, or two or more types thereof may be used in combination.

Examples of the ester oil (B1), the polyvinyl ether (B2), and the polyalkylene glycol (B3) in the oxygen atom-containing base oil as the lubricant base oil include those similar to the ester oil (B1), the polyvinyl ether (B2), and the polyalkylene glycol (B3) exemplified as the oxygen atom-containing base oil (B) used in the viscosity index improver described above.

As the ester oil (B1) in the oxygen atom-containing base oil as the lubricant base oil, the polyol ester (B12) is preferable, and the polyol ester (B12-2) of polyhydric (dihydric to decahydric) alcohol (x2) and monovalent carboxylic acid (y1) is more preferable.

The refrigerating machine oil of the present invention may further contain a base oil different from the oxygen atom-containing base oil. The base oil may be, for example, a hydrocarbon oil or an additional oxygen-containing oil. Examples of the hydrocarbon oil include mineral oils, olefin polymers, naphthalene compounds, and alkyl benzenes. Examples of the additional oxygen atom-containing base oil include esters such as complex esters, and ethers such as aliphatic ether, polyphenyl ethers, and perfluoroethers.

The SP value of the oxygen atom-containing base oil in the refrigerating machine oil is preferably 8.0 to 10.0 $(cal/cm^3)^{1/2}$, more preferably 8.4 to 9.5 $(cal/cm^3)^{1/2}$, from the viewpoint of the solubility of the copolymer (A).

When two or more types of the oxygen atom-containing base oils are contained in the refrigerating machine oil (e.g. a case where an oxygen-containing base oil as a lubricant base oil is different from a polymerized oil of the viscosity index improver or an oxygen-containing base oil as a diluting solvent), preferably, a value obtained by calculating the SP values in the refrigerating machine oil by the above method, and arithmetically averaging the calculated SP values based on the mass fraction is within the above range.

The absolute value of the difference between the SP value of the copolymer (A) and the SP value of the oxygen atom-containing base oil in the refrigerating machine oil is preferably 2.0 $(cal/cm^3)^{1/2}$ or less, more preferably 1.5 $(cal/cm^3)^{1/2}$ or less, particularly preferably 1.0 $(cal/cm^3)^{1/2}$ or less, from the viewpoint of the solubility of the copolymer (A) and the oxygen atom-containing base oil and the solubility of the copolymer (A) and the oxygen atom-containing base oil in the refrigerant.

When the refrigerating machine oil contains two or more types of the oxygen atom-containing base oils, preferably, the SP values of the oxygen atom-containing base oils in the refrigerating machine oil are calculated by the above method, and arithmetically averaged based on the mass fraction to obtain a (averaged) SP value of the oxygen atom-containing base oil. The absolute value of a difference between the SP value of the oxygen atom-containing base oil and the SP value of the copolymer (A) is preferably within the above range.

The kinematic viscosity at 40° C. of the oxygen atom-containing base oil in the refrigerating machine oil (measured in accordance with JIS-K 2283) is generally 1 to 200 $mm^2/s$, preferably 5 to 100 $mm^2/s$, more preferably 7 to 50 $mm^2/s$, from the viewpoint of the viscosity index improving effect and the kinematic viscosity at low temperatures.

The kinematic viscosity at 100° C. of the oxygen atom-containing base oil in the refrigerating machine oil (measured in accordance with JIS-K 2283) is preferably 1 to 10 $mm^2/s$, more preferably 1 to 9 $mm^2/s$, from the viewpoint of the viscosity index improving effect and the kinematic viscosity at low temperatures.

The viscosity index (measured in accordance with JIS-K 2283) of the oxygen atom-containing base oil in the refrigerating machine oil is generally 0 or more. From the viewpoint of the effect of improving the viscosity index of the refrigerating machine oil, the viscosity index is preferably 50 or more, more preferably 50 to 180.

In the present invention, the refrigerating machine oil may further contain various additives as necessary, in addition to the viscosity index improver of the present invention and the oxygen atom-containing base oil (B). Examples of the additives include an acid-acceptor, an antioxidant, an extreme pressure agent, an oiliness agent, an antifoamer, a metal deactivator, an antiwear agent, a pour point depressant, and a detergent dispersant. The additive content is preferably 5 mass % or less, more preferably 2 mass % or less, based on the total amount of the various additives relative to the total amount of the refrigerating machine oil.

In the refrigerating machine oil of the present invention, the content of the oxygen atom-containing base oil is generally 50 mass % or more, preferably 60 mass % or more, based on the total amount of the refrigerating machine oil. In terms of having excellent characteristics required for the refrigerating machine oil, such as lubricity, compatibility, thermal/chemical stability, and electrical insulation properties, the content is preferably 70 mass % or more, more preferably 80 mass % or more, still more preferably 90 mass % or more, based on the total amount of the refrigerating machine oil.

When the viscosity index improver of the present invention is contained in the refrigerating machine oil, the content of the viscosity index improver or the copolymer (A) is generally 50 mass % or less based on the total amount of the refrigerating machine oil. From the viewpoint of viscosity index, the content of the viscosity index improver or the copolymer (A) is preferably 1 to 20 mass %, more preferably 2 to 10 mass %, based on the total amount of the refrigerating machine oil.

The kinematic viscosity at 40° C. of the refrigerating machine oil is not limited, but is preferably 3 to 1000 mm$^2$/s, more preferably 4 to 500 mm$^2$/s, still more preferably 5 to 400 mm$^2$/s. However, the kinematic viscosity of the refrigerating machine oil is more preferably 15 mm$^2$/s or more or 30 mm$^2$/s or more, and may be 200 mm$^2$/s or less, 100 mm$^2$/s or less, or 85 mm$^2$/s or less, in terms of being able to lower low-temperature viscosity characteristics while maintaining a high kinematic viscosity and of balancing compatibility with the refrigerant.

The kinematic viscosity at 100° C. of the refrigerating machine oil is not limited, but may be preferably set to 1 to 100 mm$^2$/s, more preferably 2 to 50 mm$^2$/s. In terms of being able to lower low-temperature viscosity characteristics while maintaining a high kinematic viscosity and of balancing compatibility with the refrigerant, the kinematic viscosity is further preferably 5 mm$^2$/s or more or 7 mm$^2$/s or more, and may be 25 mm$^2$/s or less, 20 mm$^2$/s or less, or 15 mm$^2$/s or less.

The viscosity index of the refrigerating machine oil is not limited, but is preferably 90 or more, more preferably 100 or more, still more preferably 120 or more, yet still more preferably 200 or more, 250 or more, or 300 or more. In terms of being able to lower low-temperature viscosity characteristics while maintaining a high kinematic viscosity at 100° C. and of balancing compatibility with the refrigerant, the viscosity index of the oxygen-containing base oil and the amount of the viscosity index improver blended can be freely set, and may be, for example, 400 or less, 350 or less, 300 or less, or 250 or less. For the same reason, the improvement ratio of the viscosity index of the refrigerating machine oil to the viscosity index of the oxygen-containing base oil contained in the refrigerating machine oil may be, for example, 1.5 times or more, preferably 2 times or more, more preferably 2.5 times or more, still more preferably 3 times or more, and may be preferably 10 times or less, more preferably 8 times or less, still more preferably 6 times or less.

The volume resistivity of the refrigerating machine oil is not limited, but can be preferably $1.0 \times 10^9$ Ω·m or more, more preferably $1.0 \times 10^{10}$ Ω·m or more, most preferably $1.0 \times 10^{11}$ Ω·m or more. In particular, when the refrigerating machine oil is used for a hermetic refrigerating machine, high electrical insulation properties tend to be required. In the present invention, the volume resistivity means a value at 25° C. measured in accordance with JIS C 2101 "Testing methods of electrical insulating oils".

The moisture content of the refrigerating machine oil is not limited, but can be preferably 200 ppm or less, more preferably 100 ppm or less, most preferably 50 ppm or less, based on the total amount of the refrigerating machine oil. In particular, in a case where the refrigerating machine oil is used for a hermetic refrigerating machine, the moisture content is required to be small from the viewpoint of the influence on the thermal/chemical stability and electrical insulation properties of the refrigerating machine oil.

The acid value of the refrigerating machine oil is not limited, but may be preferably 0.1 mgKOH/g or less, more preferably 0.05 mgKOH/g or less, to prevent corrosion of the metal used in the refrigerating machine or the pipe and to prevent decomposition of the ester contained in the refrigerating machine oil in the present invention. In the present invention, the acid value means an acid value measured in accordance with JIS K 2501 "Petroleum products and lubricants-Determination of neutralization number".

The ash content of the refrigerating machine oil is not limited, but may be preferably 100 ppm or less, more preferably 50 ppm or less, to enhance the thermal/chemical stability of the refrigerating machine oil and suppress the generation of sludge or the like in the present invention. In the present invention, the ash content means an ash content value measured in accordance with JIS K 2272 "Crude oil and petroleum products-Determination of ash and sulfated ash".

The refrigerating machine oil that contains the viscosity index improver of the present invention is suitably used in an air conditioner having a reciprocating or rotating hermetic compressor, a refrigerator, an open or closed automobile air conditioner, a dehumidifier, a water heater, a freezer, a freezing/refrigerating warehouse, a vending machine, a showcase, a refrigerating machine in a chemical plant or the like, a refrigerating machine with a centrifugal compressor, and the like.

Working Fluid Composition for Refrigerating Machines

When the viscosity index improver of the present invention is used as a viscosity index improver for refrigerating machine oils, the viscosity index improver is present in a state of a working fluid composition for refrigerating machines mixed with the refrigerant (C) in a refrigerating machine. That is, the working fluid composition for refrigerating machines of the present invention contains the refrigerating machine oil of the present invention (a lubricant base oil and the viscosity index improver of the present invention) and the refrigerant (C). The viscosity index improver of the present invention is preferably used in the working fluid composition for refrigerating machines which contains the refrigerant (C) and the oxygen atom-containing base oil (B).

Examples of the refrigerant (C) include saturated fluorinated hydrocarbon refrigerants {such as difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc)}, unsaturated fluorinated hydrocarbon refrigerants {such as 2,3,3,3-tetrafluoropropene (R1234yf), 1,2,3,3,3-pentafluoropropene (R1225ye), 1,3,3,3-tetrafluoropropene (R1234ze), 1,2,3,3-tetrafluoropropene (R1234ye), 3,3,3-trifluoropropene (HFO-1243zf), monofluoroethylene (HFO-1141), difluoroethylene (HFO-1132), 1,1,2-trifluoroethylene (R1123), (Z)-1,1,1,4,4,4-hexafluoro-2 butene (R1336mzz (Z)), and 1-chloro-2,3,3,3-tetrafluoropropene (HCFO-1224yd)}, and natural refrigerants {carbon dioxide, ammonia, n-propane, n-butane, and n-isobutane}.

The saturated fluorinated hydrocarbon refrigerant may be a mixture of two or more types of the above refrigerants. Examples of the mixture include a mixture of R134a/R32=60 to 80 mass %/40 to 20 mass %, a mixture of R32/R125=40 to 70 mass %/60 to 30 mass %, a mixture of R125/R143a=40 to 60 mass %/60 to 40 mass %, a mixture of R134a/R32/R125=60 mass %/30 mass %/10 mass %, a mixture of R134a/R32/R125=40 to 70 mass %/15 to 35 mass %/5 to 40 mass %, and a mixture of R125/R134a/R143a=35 to 55 mass %/1 to 15 mass %/40 to 60 mass %.

More specific examples of the mixture include a mixture of R134a/R32=70/30 mass %; a mixture of R32/R125=60/40 mass %; a mixture of R32/R125=50/50 mass % (R410A); a mixture of R32/R125=45/55 mass % (R410B); a mixture of R125/R143a=50/50 mass % (R507C); a mixture of R32/R125/R134a=30/10/60 mass %; a mixture of R32/R125/R134 a=23/25/52 mass % (R407C); a mixture of R32/R125/R134a=25/15/60 mass % (R407E); and a mixture of R125/R134a/R143a=44/4/52 mass % (R404A).

From the viewpoint of compatibility with the copolymer (A), the refrigerant (C) is preferably at least one refrigerant selected from a saturated fluorinated hydrocarbon refrigerant, an unsaturated fluorinated hydrocarbon refrigerant, and a natural refrigerant, or a mixed refrigerant of two or more thereof, preferably at least one selected from the group consisting of a C1-C3 saturated or unsaturated fluorinated hydrocarbon refrigerant, carbon dioxide, ammonia, n-propane, n-butane, and n-isobutane, more preferably at least one selected from the group consisting of R32, R125, R134a, R410A, R407C, R1234yf, R1234ze, carbon dioxide, ammonia, n-propane, n-butane, and n-isobutane, still more preferably R32, R125, R134a, R410A, R407C, R1234yf, and R1234ze, particularly preferably R32, R125, R134a, R410A, R407C, and R1234yf.

The content of the copolymer (A) in the working fluid composition for refrigerating machines is preferably 0.1 to 30 parts by mass, more preferably 0.2 to 10 parts by mass, based on 100 parts by mass of the refrigerant (C).

In the working fluid composition for refrigerating machines, the mass ratio (refrigerant (C)/refrigerating machine oil) of the refrigerant (C) to the refrigerating machine oil (the total mass of the copolymer (A) and the oxygen atom-containing base oil (B)) is preferably 99/1 to 1/99, more preferably 95/5 to 40/60.

The following matters are disclosed in the present specification.

Disclosure 1 relates to a viscosity index improver containing a copolymer (A) that contains, as essential constituent monomers, a fluorine atom-containing monomer (a) represented by the following formula (1) and a monomer (b) represented by the following formula (2), wherein the copolymer (A) has a solubility parameter of 8.1 to 10.0 $(cal/cm^3)^{1/2}$, and a mass ratio (b/a) of the monomer (b) to the monomer (a) in the monomers constituting the copolymer (A) is 0.01 to 42:

[Formula 6]

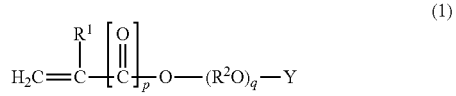

(1)

wherein $R^1$ represents a hydrogen atom or a methyl group; $R^2$ is a C2-C4 alkylene group; p is an integer of 0 or 1; q is an integer from 0 to 20, each $R^2$ may be the same as or different from each other when q is 2 or greater; and Y is a monovalent group in which one or more or all of hydrogen atoms in a C1-C40 hydrocarbon group are replaced by fluorine atoms, and

[Formula 7]

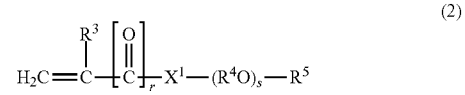

(2)

wherein $R^3$ represents a hydrogen atom or a methyl group; —$X^1$— is a group represented by —O— or —NH—; $R^4$ is a C2-C4 alkylene group; r is an integer of 0 or 1; s is an integer from 0 to 20, and each $R^4$ may be the same as or different from each other when s is 2 or greater; and $R^5$ is a C1-C40 hydrocarbon group.

Disclosure 2 relates to the viscosity index improver according to Disclosure 1, wherein a constituent unit derived from the monomer (a) has a solubility parameter of 6.5 to 9.0 $(cal/cm^3)^{1/2}$.

Disclosure 3 relates to the viscosity index improver according to Disclosure 1 or 2, wherein the copolymer (A) has a weight-average molecular weight of 1,000 to 2,000,000.

Disclosure 4 relates to the viscosity index improver according to any one of Disclosures 1 to 3, further containing an oxygen atom-containing base oil.

Disclosure 5 relates to the refrigerating machine oil containing:
a lubricant base oil; and
the viscosity index improver according to any combination with any one of Disclosures 1 to 4.

Disclosure 6 relates to the refrigerating machine oil according to Disclosure 5, further containing an oxygen atom-containing base oil.

Disclosure 7 relates to the refrigerating machine oil according to Disclosure 6, wherein the oxygen atom-containing base oil is at least one selected from the group consisting of an ester oil (B1), a polyvinyl ether (B2), and a polyalkylene glycol (B3).

Disclosure 8 relates to the refrigerating machine oil according to Disclosure 6 or 7, wherein an absolute value of a difference between a solubility parameter of the copolymer (A) and a solubility parameter of the oxygen atom-containing base oil is 2.0 $(cal/cm^3)^{1/2}$ or less.

Disclosure 9 relates to the refrigerating machine oil according to any one of Disclosures 6 to 8, wherein the oxygen atom-containing base oil has a solubility parameter of 8.0 to 10.0 $(cal/cm^3)^{1/2}$.

Disclosure 10 relates to the working fluid composition for refrigerating machines containing:
the refrigerating machine oil according to any one of Disclosures 5 to 9; and
a refrigerant.

Disclosure 11 relates to the working fluid composition for refrigerating machines according to Disclosure 10, wherein the refrigerant is at least one refrigerant selected from the group consisting of a saturated fluorinated hydrocarbon refrigerant, an unsaturated fluorinated hydrocarbon refrigerant, and a natural refrigerant, or a mixed refrigerant of two or more of these refrigerants.

EXAMPLES

Hereinafter, the present invention will be described more specifically based on Examples, but the present invention is not limited to the Examples.

Example 1

Production of Viscosity Index Improver (R-1)

A reaction vessel equipped with a stirrer, a heating and cooling device, a thermometer, and a nitrogen inlet tube was charged with 100 parts by mass of a monomer formulation {20 parts by mass of monomer (a-1) [2,2,2-trifluoroethyl methacrylate] and 80 parts by mass of monomer (b-4) [n-butyl methacrylate]} in total, 400 parts by mass of an oxygen atom-containing base oil (B-1) [diesterified product of neopentyl glycol and 2-ethylhexanoic acid] as a polymerized oil, and 0.2 parts by mass of 2,2'-azobis(2,4-dimethylvaleronitrile) as a polymerization catalyst, and nitrogen substitution (oxygen concentration in the gas phase: 100 ppm) was performed. The temperature was raised to 76° C. while stirring was carried out in a sealed state, and a polymerization reaction was performed at the same temperature for 5 hours. After the temperature was raised to 90° C., aging was performed for 2 hours. After the temperature was raised to 120° C., unreacted monomers were removed under reduced pressure (0.027 to 0.040 MPa) at the same temperature over 1 hour to prepare a viscosity index improver (R-1) containing a copolymer (A-1).

Examples 2 to 18, Comparative Examples 1 to 7

[Production of Viscosity Index Improvers (R-2) to (R-18) and (R'-1) to (R'-7)]

Each reaction was carried out in a similar manner except that the monomer formulation and the polymerized oil were changed to those shown in Tables 2 to 5 in Example 1, and thus polymer solutions (R-2) to (R-18) and (R'-1) to (R'-7) each containing a polymer were prepared.

TABLE 2

| | | SP value | Example 1 (R-1) (A-1) | Example 2 (R-2) (A-2) | Example 3 (R-3) (A-3) | Example 4 (R-4) (A-4) | Example 5 (R-5) (A-5) | Example 6 (R-6) (A-6) |
|---|---|---|---|---|---|---|---|---|
| Copolymer (A) | Monomer formulation (parts by mass) | | | | | | | |
| Viscosity index improver | Monomer (a) (a-1) 2,2,2-trifluoroethyl methacrylate | 8.66 | 20 | 20 | — | — | — | — |
| | (a-2) 2,2,3,3,3-pentafluoropropyl methacrylate | 8.38 | — | — | 20 | — | — | — |
| | (a-3) 2-(perfluorooctyl)ethyl methacrylate | 7.64 | — | — | — | 20 | — | — |
| | (a-4) 2-(perfluorohexyl)ethyl methacrylate | 7.81 | — | — | — | — | 20 | 10 |
| Monomer (b) | (b-1) Methyl methacrylate | 9.93 | — | — | — | — | — | — |
| | (b-2) Ethyl methacrylate | 9.72 | — | 40 | — | — | — | — |
| | (b-3) Isopropyl methacrylate | 9.36 | — | — | — | — | — | — |
| | (b-4) n-butyl methacrylate | 9.45 | 80 | 40 | 80 | 80 | 80 | 90 |
| | (b-5) Isobutyl methacrylate | 9.27 | — | — | — | — | — | — |
| | (b-6) tert-butyl methacrylate | 9.07 | — | — | — | — | — | — |
| | (b-7) n-dodecyl methacrylate | 9.02 | — | — | — | — | — | — |
| | (b-8) Esterified product of Neodol 45 and methacrylic acid | 8.97 | — | — | — | — | — | — |
| | (b-9) n-octadecyl methacrylate | 8.90 | — | — | — | — | — | — |
| | (b-10) 2-n-dodecylhexadecyl methacrylate | 8.75 | — | — | — | — | — | — |
| | (b-11) 2-n-tetradecyloctadecyl methacrylate | 8.72 | — | — | — | — | — | — |
| | Total | | 100 | 100 | 100 | 100 | 100 | 100 |
| | 2,2'-azobis(2,4-dimethylvaleronitrile) (parts by mass) | | 0.2 | 0.2 | 0.2 | 0.2 | 0.2 | 0.2 |
| | Mass ratio (b/a) of monomer (b) to mass of monomer (a) | | 4.0 | 4.0 | 4.0 | 4.0 | 4.0 | 9.0 |
| | Solubility parameter of copolymer (SP value) (cal/cm³)$^{1/2}$ | | 9.29 | 9.40 | 9.24 | 9.09 | 9.12 | 9.29 |
| | Mw of copolymer (× 10⁴) | | 400 | 400 | 400 | 400 | 400 | 400 |
| Polymerized oil | Oxygen atom-containing base oil (B) (B-1) Diester of neopentyl glycol and 2-ethylhexanoic acid | 8.79 | — | — | — | — | — | — |
| | (B-2) Diester of neopentyl glycol and 3,5,5-trimethylhexanoic acid | 8.52 | — | — | — | — | — | — |
| | (B-3) Diester of 2-ethylhexanol and adipic acid | 8.91 | — | — | — | — | — | — |
| | (B-4) Monoester of 2-ethylhexanol and 2-ethylhexanoic acid | 8.45 | — | — | — | — | — | — |
| | (B-5) Tetraester of pentaerythritol and 3,5,5-trimethylhexanoic acid | 8.81 | — | — | — | — | — | — |
| | (B-6) Tetraester of pentaerythritol and 2-ethylhexanoic acid | 9.15 | — | — | — | — | — | — |
| | Mass ratio (A/B) of copolymer/oxygen atom-containing base oil (B) in viscosity index improver | | 20/80 | 20/80 | 20/80 | 20/80 | 20/80 | 20/80 |
| | Compatibility between Copolymer and oxygen atom-containing base oil (B) in viscosity index improver | | Good | Good | Good | Good | Good | Good |
| | Difference in SP value (cal/cm³)$^{1/2}$ between copolymer and oxygen atom-containing base oil (B) in viscosity index improver | | 0.50 | 0.61 | 0.45 | 0.30 | 0.33 | 0.50 |
| Composition (parts by mass) | Refrigerating machine oil | parts by mass | 1 | 2 | 3 | 4 | 5 | 6 |
| | Oxygen atom-containing base oil (B) | | 80 | 80 | 80 | 80 | 80 | 80 |
| | | | (B-1) | (B-1) | (B-1) | (B-1) | (B-1) | (B-1) |
| | | | 20 | 20 | 20 | 20 | 20 | 20 |
| | Viscosity index improver parts by mass | | 4 | 4 | 4 | 4 | 4 | 4 |
| | Copolymer (A) | parts by mass | 96 | 96 | 96 | 96 | 96 | 96 |
| | Oxygen atom-containing base oil (B) | | | | | | | |
| | (B-1) Diester of neopentyl glycol and 2-ethylhexanoic acid | 8.82 | — | — | — | — | — | — |
| | (B-2) Diester of neopentyl glycol and 3,5,5-trimethylhexanoic acid | 8.52 | — | — | — | — | — | — |
| | (B-3) Diester of 2-ethylhexanol and adipic acid | 8.91 | — | — | — | — | — | — |
| | (B-4) Monoester of 2-ethylhexanol and 2-ethylhexanoic acid | 8.45 | — | — | — | — | — | — |

TABLE 2-continued

| | | | Example | | | | | |
|---|---|---|---|---|---|---|---|---|
| | | SP value | 1 (R-1) (A-1) | 2 (R-2) (A-2) | 3 (R-3) (A-3) | 4 (R-4) (A-4) | 5 (R-5) (A-5) | 6 (R-6) (A-6) |
| Viscosity index improver | (B-5) Tetraester of pentaerythritol and 3,5,5-trimethylhexanoic acid | 8.81 | — | — | — | — | — | — |
| | (B-6) Tetraester of pentaerythritol and 2-ethylhexanoic acid | 9.15 | — | — | — | — | — | — |
| Difference in SP value (cal/cm³)^(1/2) between copolymer and oxygen atom-containing base oil (B) in refrigerating machine oil | | | 0.47 | 0.58 | 0.42 | 0.27 | 0.30 | 0.47 |
| Evaluation results | Solubility of viscosity index improver (R) or (R') in oxygen atom-containing base oil (B) | | Excellent | Excellent | Excellent | Excellent | Excellent | Excellent |
| | Kinematic viscosity (mm²/s) | 100° C. | 10.0 | 9.4 | 10.2 | 10.8 | 10.6 | 10.8 |
| | | 40° C. | 37.5 | 35.5 | 38.0 | 35.9 | 36.3 | 36.8 |
| | | −20° C. | 1,000 | 980 | 1,050 | 1,800 | 1,600 | 1,700 |
| | | −40° C. | 15,000 | 13,000 | 15,500 | 30,000 | 25,000 | 28,000 |
| | Viscosity index (VI) | | 269 | 265 | 272 | 310 | 300 | 302 |
| | Compatibility test | R134a | Good | Excellent | Good | Excellent | Excellent | Good |

TABLE 3

| | | | SP value | Example 7 (R-7) (A-7) | 8 (R-8) (A-8) | 9 (R-9) (A-9) | 10 (R-10) (A-10) | 11 (R-11) (A-11) | 12 (R-12) (A-12) |
|---|---|---|---|---|---|---|---|---|---|
| Copolymer (A) | Viscosity index improver | Monomer (a) | | | | | | | |
| | Monomer formulation (parts by mass) | (a-1) 2,2,2-trifluoroethyl methacrylate | 8.66 | — | — | — | — | — | 44 |
| | | (a-2) 2,2,3,3,3-pentafluoropropyl methacrylate | 8.38 | — | — | — | — | — | — |
| | | (a-3) 2-(perfluorooctyl)ethyl methacrylate | 7.64 | — | — | — | — | — | 55 |
| | | (a-4) 2-(perfluorohexyl)ethyl methacrylate | 7.81 | 20 | 20 | 20 | 20 | 20 | — |
| | Monomer (b) | (b-1) Methyl methacrylate | 9.93 | — | — | — | — | — | — |
| | | (b-2) Ethyl methacrylate | 9.72 | — | — | — | — | — | — |
| | | (b-3) Isopropyl methacrylate | 9.36 | — | — | — | — | — | — |
| | | (b-4) n-butyl methacrylate | 9.45 | 80 | 80 | 80 | — | — | — |
| | | (b-5) Isobutyl methacrylate | 9.27 | — | — | — | — | — | — |
| | | (b-6) tert-butyl methacrylate | 9.07 | — | — | — | — | — | — |
| | | (b-7) n-dodecyl methacrylate | 9.02 | — | — | — | — | — | — |
| | | (b-8) Esterified product of Neodol 45 and methacrylic acid | 8.97 | — | — | — | 60 | 60 | — |
| | | (b-9) n-octadecyl methacrylate | 8.90 | — | — | — | — | — | — |
| | | (b-10) 2-n-dodecylhexadecyl methacrylate | 8.75 | — | — | — | — | 10 | — |
| | | (b-11) 2-n-tetradecyloctadecyl methacrylate | 8.72 | — | — | — | — | 10 | — |
| | | Total | | 100 | 100 | 100 | 100 | 100 | 100 |
| | | 2,2′-azobis(2,4-dimethylvaleronitrile) (parts by mass) | | 0.2 | 0.2 | 0.2 | 0.2 | 0.2 | 0.2 |
| | | Mass ratio (b/a) of monomer (b) to mass of monomer (a) | | 4.0 | 4.0 | 4.0 | 4.0 | 4.0 | 0.01 |
| | | Mw of copolymer (× 10⁴) | | 20 | 20 | 20 | 20 | 20 | 20 |
| | | Solubility parameter of copolymer (SP value) (cal/cm³)^{1/2} | | 9.12 | 9.12 | 9.12 | 9.18 | 8.98 | 8.11 |
| Polymerized oil | Oxygen atom-containing base oil (B) | (B-1) Diester of neopentyl glycol and 2-ethylhexanoic acid | 8.82 | — | 400 | 400 | 400 | 400 | 400 |
| | | (B-2) Diester of neopentyl glycol and 3,5,5-trimethylhexanoic acid | 8.52 | 400 | — | — | — | — | — |
| | | (B-3) Diester of 2-ethylhexanol and adipic acid | 8.91 | — | — | — | — | — | — |
| | | (B-4) Monoester of 2-ethylhexanol and 2-ethylhexanoic acid | 8.45 | — | — | — | — | — | — |
| | | (B-5) Tetraester of pentaerythritol and 3,5,5-trimethylhexanoic acid | 8.81 | — | — | — | — | — | — |
| | | (B-6) Tetraester of pentaerythritol and 2-ethylhexanoic acid | 9.15 | — | — | — | — | — | — |
| | | Mass ratio (A/B) of copolymer/oxygen atom-containing base oil (B) in viscosity index improver | | 20/80 | 20/80 | 20/80 | 20/80 | 20/80 | 20/80 |
| | | Compatibility between Copolymer and oxygen atom-containing base oil (B) in viscosity index improver | | Good | Good | Good | Good | Good | Good |
| | | Difference in SP value (cal/cm³)^{1/2} between copolymer and oxygen atom-containing base oil (B) in viscosity index improver | | 0.21 | 0.30 | 0.30 | 0.36 | 0.16 | 0.71 |
| Composition (parts by mass) | Refrigerating machine oil | Viscosity index improver | | 7 (B-1) | 8 (B-3) | 9 (B-5) (B-6) | 10 (B-1) | 11 (B-1) | 12 (B-1) |
| | | Copolymer (A) | | 80 | 80 | 80 | 80 | 80 | 80 |
| | Oxygen atom-containing base oil (B) | parts by mass | | 20 | 20 | 20 | 20 | 20 | 20 |
| | | | | 4 | 4 | 4 | 4 | 4 | 4 |
| | Viscosity index improver | parts by mass | | 80 | 80 | 16 | 96 | 96 | 96 |
| | | Copolymer (A) | | | | | | | |
| | Oxygen atom-containing base oil (B) | (B-1) Diester of neopentyl glycol and 2-ethylhexanoic acid | 8.79 | — | — | — | — | — | — |
| | | (B-2) Diester of neopentyl glycol and 3,5,5-trimethylhexanoic acid | 8.52 | 16 | — | — | — | — | — |
| | | (B-3) Diester of 2-ethylhexanol and adipic acid | 8.91 | — | 80 | — | — | — | — |
| | | (B-4) Monoester of 2-ethylhexanol and 2-ethylhexanoic acid | 8.45 | — | — | — | — | — | — |

TABLE 3-continued

| | | SP value | Example 7 (R-7) (A-7) | Example 8 (R-8) (A-8) | Example 9 (R-9) (A-9) | Example 10 (R-10) (A-10) | Example 11 (R-11) (A-11) | Example 12 (R-12) (A-12) |
|---|---|---|---|---|---|---|---|---|
| Viscosity index improver | (B-5) Tetraester of pentaerythritol and 3,5,5-trimethylhexanoic acid | 8.81 | — | — | 40 | — | — | — |
| | (B-6) Tetraester of pentaerythritol and 2-ethylhexanoic acid | 9.15 | — | — | 40 | — | — | — |
| Difference in SP value $(cal/cm^3)^{1/2}$ between copolymer and oxygen atom-containing base oil (B) in refrigerating machine oil | | | 0.31 | 0.23 | 0.17 | 0.39 | 0.19 | 0.68 |
| Evaluation results | Solubility of viscosity index improver (R) or (R') in oxygen atom-containing base oil (B) | | Excellent | Excellent | Excellent | Excellent | Excellent | Good |
| | Kinematic viscosity ($mm^2/s$) | 100° C. | 10.7 | 10.4 | 24.6 | 10.4 | 10.6 | 9.5 |
| | | 40° C. | 36.5 | 32.6 | 170.0 | 36.1 | 35.6 | 34.3 |
| | | −20° C. | 2,000 | 20,000 | 40,000 | 1,500 | 2,000 | 1,000 |
| | | −40° C. | 32,000 | 100,000 | 600,000 | 22,000 | 30,000 | 12,000 |
| | Viscosity index (VI) | | 301 | 330 | 177 | 295 | 303 | 260 |
| | Compatibility test | R134a | Excellent | Excellent | Excellent | Excellent | Good | Excellent |

TABLE 4

| | | | SP value | Example 13 (R-13) (A-13) | 14 (R-14) (A-14) | 15 (R-15) (A-15) | 16 (R-16) (A-16) | 17 (R-17) (A-17) | 18 (R-18) (A-18) |
|---|---|---|---|---|---|---|---|---|---|
| Copolymer (A) | Monomer formulation (parts by mass) | Viscosity index improver Monomer (a) (a-1) 2,2,2-trifluoroethyl methacrylate | 8.66 | — | — | — | — | — | — |
| | | (a-2) 2,2,3,3,3-pentafluoropropyl methacrylate | 8.38 | — | — | — | — | — | — |
| | | (a-3) 2-(perfluorooctyl)ethyl methacrylate | 7.64 | — | — | — | — | — | — |
| | | (a-4) 2-(perfluorohexyl)ethyl methacrylate | 7.81 | 2.4 | 20 | 20 | 20 | 20 | 20 |
| | Monomer (b) | (b-1) Methyl methacrylate | 9.93 | — | — | — | — | — | — |
| | | (b-2) Ethyl methacrylate | 9.72 | — | — | — | — | — | — |
| | | (b-3) Isopropyl methacrylate | 9.36 | — | — | — | — | — | — |
| | | (b-4) n-butyl methacrylate | 9.45 | 97.6 | — | — | — | — | — |
| | | (b-5) Isobutyl methacrylate | 9.27 | — | — | — | — | — | — |
| | | (b-6) tert-butyl methacrylate | 9.07 | — | 80 | 10 | — | 10 | 10 |
| | | (b-7) n-dodecyl methacrylate | 9.02 | — | — | 70 | 70 | 70 | 70 |
| | | (b-8) Esterified product of Neodol 45 and methacrylic acid | 8.97 | — | — | — | — | — | — |
| | | (b-9) n-octadecyl methacrylate | 8.90 | — | — | — | — | — | — |
| | | (b-10) 2-n-dodecylhexadecyl methacrylate | 8.75 | — | — | — | — | — | — |
| | | (b-11) 2-n-tetradecyloctadecyl methacrylate | 8.72 | — | — | — | — | — | — |
| | | Total | | 100 | 100 | 100 | 100 | 100 | 100 |
| | 2,2'-azobis(2,4-dimethylvaleronitrile) (parts by mass) | | | 0.2 | 0.2 | 0.2 | 0.2 | 6 | 0.01 |
| | Mass ratio (b/a) of monomer (b) to mass of monomer (a) | | | 40.7 | 4.0 | 4.0 | 4.0 | 4.0 | 4.0 |
| | Mw of copolymer (× 10⁴) | | | 20 | 20 | 20 | 20 | 0.1 | 60 |
| | Solubility parameter of copolymer (SP value) (cal/cm³)^(1/2) | | | 9.41 | 8.82 | 8.84 | 8.85 | 8.84 | 8.84 |
| Polymerized oil | Oxygen atom-containing base oil (B) | (B-1) Diester of neopentyl glycol and 2-ethylhexanoic acid | 8.82 | 400 | 400 | 400 | 400 | 400 | 400 |
| | | (B-2) Diester of neopentyl glycol and 3,5,5-trimethylhexanoic acid | 8.52 | — | — | — | — | — | — |
| | | (B-3) Diester of 2-ethylhexanoic acid and adipic acid | 8.91 | — | — | — | — | — | — |
| | | (B-4) Monoester of 2-ethylhexanol and adipic acid | 8.45 | — | — | — | — | — | — |
| | | (B-5) Tetraester of pentaerythritol and 3,5,5-trimethylhexanoic acid | 8.81 | — | — | — | — | — | — |
| | | (B-6) Tetraester of pentaerythritol and 2-ethylhexanoic acid | 9.15 | — | — | — | — | — | — |
| | Mass ratio (A/B) of copolymer/oxygen atom-containing base oil (B) in viscosity index improver | | | 20/80 | 20/80 | 20/80 | 20/80 | 20/80 | 20/80 |
| | Compatibility between Copolymer and oxygen atom-containing base oil (B) in viscosity index improver | | | Good | Good | Good | Good | Good | Good |
| | Difference in SP value (cal/cm³)^(1/2) between copolymer and oxygen atom-containing base oil (B) in viscosity index improver | | | 0.59 | 0.00 | 0.02 | 0.03 | 0.02 | 0.02 |
| Composition (parts by mass) | Refrigerating machine oil | | | 13 | 14 | 15 | 16 | 17 | 18 |
| | | parts by mass | | 80 | 80 | 80 | 80 | 80 | 80 |
| | Viscosity index improver | Copolymer (A) | | (B-1) | (B-1) | (B-1) | (B-1) | (B-1) | (B-1) |
| | | parts by mass | | 20 | 20 | 20 | 20 | 20 | 20 |
| | Oxygen atom-containing base oil (B) | (B-1) Diester of neopentyl glycol and 2-ethylhexanoic acid | 8.79 | 4 | 4 | 4 | 4 | 4 | 4 |
| | | | | 96 | 96 | 96 | 96 | 96 | 96 |
| | | (B-2) Diester of neopentyl glycol and 3,5,5-trimethylhexanoic acid | 8.52 | — | — | — | — | — | — |
| | | (B-3) Diester of 2-ethylhexanoic acid and adipic acid | 8.91 | — | — | — | — | — | — |
| | | (B-4) Monoester of 2-ethylhexanol and adipic acid | 8.45 | — | — | — | — | — | — |

TABLE 4-continued

| | | SP value | 13 (R-13) (A-13) | 14 (R-14) (A-14) | Example 15 (R-15) (A-15) | 16 (R-16) (A-16) | 17 (R-17) (A-17) | 18 (R-18) (A-18) |
|---|---|---|---|---|---|---|---|---|
| Viscosity index improver | (B-5) Tetraester of pentaerythritol and 3,5,5-trimethylhexanoic acid | 8.81 | — | — | — | — | — | — |
| | (B-6) Tetraester of pentaerythritol and 2-ethylhexanoic acid | 9.15 | — | — | — | — | — | — |
| Difference in SP value (cal/cm$^3$)$^{1/2}$ between copolymer and oxygen atom-containing base oil (B) in refrigerating machine oil | | | 0.62 | 0.03 | 0.05 | 0.06 | 0.05 | 0.05 |
| Evaluation results | Solubility of viscosity index improver (R) or (R') in oxygen atom-containing base oil (B) | | Excellent | Excellent | Excellent | Excellent | Excellent | Excellent |
| | Kinematic viscosity (mm$^2$/s) | 100° C. | 11.0 | 8.1 | 8.6 | 8.5 | 2.4 | 21.0 |
| | | 40° C. | 36.6 | 32.3 | 34.5 | 34.5 | 8.5 | 80.0 |
| | | −20° C. | 2,000 | 1,600 | 1,500 | 1,500 | 200 | 5,000 |
| | | −40° C. | 30,500 | 25,000 | 24,000 | 24,000 | 1,000 | 60,000 |
| | Viscosity index (VI) | | 310 | 240 | 242 | 238 | 100 | 288 |
| | Compatibility test | R134a | Good | Excellent | Excellent | Excellent | Excellent | Excellent |

TABLE 5

| | | SP value | Comparative Example 1 (R'-1) (A'-1) | 2 (R'-2) (A'-2) | 3 (R'-3) (A'-3) | 4 (R'-4) (A'-4) | 5 (R'-5) (A'-5) | 6 (R'-6) (A'-6) | 7 (R'-7) (A'-7) |
|---|---|---|---|---|---|---|---|---|---|
| Copolymer (A) | Monomer formulation (parts by mass) | | | | | | | | |
| | Monomer (a) (a-1) 2,2,2-trifluoroethyl methacrylate | 8.66 | — | — | — | — | — | 1.5 | — |
| | (a-2) 2,2,3,3,3-pentafluoropropyl methacrylate | 8.38 | — | 1.6 | — | — | — | — | — |
| | (a-3) 2-(perfluorooctyl)ethyl methacrylate | 7.64 | — | — | — | 100 | 70 | — | — |
| | (a-4) 2-(perfluorohexyl)ethyl methacrylate | 7.81 | 91 | — | — | — | — | — | 60 |
| | Monomer (b) (b-1) Methyl methacrylate | 9.93 | 3 | — | — | — | — | — | — |
| | (b-2) Ethyl methacrylate | 9.72 | — | — | — | — | — | — | — |
| | (b-3) Isopropyl methacrylate | 9.36 | — | — | — | — | — | — | — |
| | (b-4) n-butyl methacrylate | 9.45 | — | — | 95 | — | — | — | — |
| | (b-5) Isobutyl methacrylate | 9.27 | — | — | — | — | — | — | — |
| | (b-6) tert-butyl methacrylate | 9.07 | — | — | — | — | — | — | — |
| | (b-7) n-dodecyl methacrylate | 9.02 | — | 68.4 | — | — | — | 98.5 | 32 |
| | (b-8) Esterified product of Neodol 45 and methacrylic acid | 8.97 | 6 | 30 | — | — | — | — | — |
| | (b-9) n-octadecyl methacrylate | 8.90 | — | — | — | — | 15 | — | 8 |
| | (b-10) 2-n-dodecylhexadecyl methacrylate | 8.75 | — | — | 2.5 | — | — | — | — |
| | (b-11) 2-n-tetradecyloctadecyl methacrylate | 8.72 | — | — | 2.5 | — | 15 | — | — |
| | Total | | 100 | 100 | 100 | 100 | 100 | 100 | 100 |
| | 2,2'-azobis(2,4-dimethylvaleronitrile) (parts by mass) | | 3.2 | 0.2 | 0.2 | 0.2 | 3 | 0.2 | 3.5 |
| | Mass ratio (b/a) of monomer (b) to mass of monomer (a) | | 0.10 | 62 | 20 | 0.00 | 0.43 | 66 | 2 |
| | Mw of copolymer (×10⁴) | | 3.8 | 20 | 20 | 20 | 5 | 20 | 2 |
| | Solubility parameter of copolymer (SP value) (cal/cm³)^{1/2} | | 7.79 | 8.96 | 9.41 | 8.66 | 7.97 | 9.44 | 9.69 |
| Polymerized oil | Oxygen atom-containing base oil (B) (B-1) Diester of neopentyl glycol and 2-ethylhexanoic acid | 8.82 | 400 | — | — | — | — | — | — |
| | (B-2) Diester of neopentyl glycol and 3,5,5-trimethylhexanoic acid | 8.52 | — | 400 | 400 | 400 | — | 400 | — |
| | (B-3) Diester of 2-ethylhexanol and adipic acid | 8.91 | — | — | — | — | 400 | — | — |
| | (B-4) Monoester of 2-ethylhexanol and 3,5,5-trimethylhexanoic acid | 8.45 | — | — | — | — | — | — | 200 |
| | (B-5) Tetraester of pentaerythritol and 2-ethylhexanoic acid | 8.81 | — | — | — | — | — | — | 200 |
| | (B-6) Tetraester of pentaerythritol and 3,5,5-trimethylhexanoic acid | 9.15 | — | — | — | — | — | — | — |
| | Mass ratio (A/B) of copolymer/oxygen atom-containing base oil (B) in viscosity index improver | | 20/80 | 20/80 | 20/80 | 20/80 | 20/80 | 20/80 | 20/80 |
| | Compatibility between Copolymer and oxygen atom-containing base oil (B) in viscosity index improver | | Poor | Good | Good | Poor | Poor | Good | Good |
| | Difference in SP value (cal/cm³)^{1/2} between copolymer and oxygen atom-containing base oil (B) in viscosity index improver | | 1.04 | 0.44 | 0.89 | 0.16 | 0.94 | 0.99 | 0.71 |
| | Refrigerating machine oil | | 1' (A) was not dissolved in (B). | 2' (B-5) 80 | 3' (B-6) 80 | 4' (A) was not dissolved in (B). | 5' (A) was not dissolved in (B). | 6 (B-1) 80 | 7 (B-5) 80 (B-6) 20 |
| | parts by mass | | | 20 | 20 | | | 20 | |
| Composition (parts by mass) | Viscosity index improver | Copolymer (A) | | 4 | 4 | | | 4 | 4 |
| | Oxygen atom-containing base oil (B) | (B-1) Diester of neopentyl glycol and 2-ethylhexanoic acid | 8.79 | — | — | — | — | 80 | — |
| | | (B-2) Diester of neopentyl glycol and 3,5,5-trimethylhexanoic acid | 8.52 | 16 | 16 | | | | — |
| | | (B-3) Diester of 2-ethylhexanol and adipic acid | 8.91 | | — | — | | 16 | — |
| | | (B-4) Monoester of 2-ethylhexanol and 3,5,5-trimethylhexanoic acid | 8.45 | | | | | | |

TABLE 5-continued

| Viscosity index improver | | | Comparative Example | | | | | | |
|---|---|---|---|---|---|---|---|---|---|
| | | SP value | 1 (R'-1) (A'-1) | 2 (R'-2) (A'-2) | 3 (R'-3) (A'-3) | 4 (R'-4) (A'-4) | 5 (R'-5) (A'-5) | 6 (R'-6) (A'-6) | 7 (R'-7) (A'-7) |
| (B-5) Tetraester of pentaerythritol and 3,5,5-trimethylhexanoic acid | | 8.81 | — | 80 | — | — | — | — | 48 |
| (B-6) Tetraester of pentaerythritol and 2-ethylhexanoic acid | | 9.15 | — | — | 80 | — | — | — | 48 |
| Difference in SP value (cal/cm³)$^{1/2}$ between copolymer and oxygen atom-containing base oil (B) in refrigerating machine oil | | | — | 0.20 | 0.37 | — | — | 0.70 | 0.71 |
| Evaluation results | Solubility of viscosity index improver (R) or (R') in oxygen atom-containing base oil (B) | | — | Good | Good | — | — | Good | Good |
| | Kinematic viscosity (mm²/s) | 100° C. | — | 33.7 | 19.5 | — | — | 9.5 | 10.3 |
| | | 40° C. | — | 191.0 | 106.0 | — | — | 37.1 | 42.0 |
| | | −20° C. | — | 50000 | 39000 | — | — | 1000 | 1100 |
| | | −40° C. | — | 700000 | 600000 | — | — | 13000 | 15000 |
| | Viscosity index (VI) | | — | 224 | 207 | — | — | 255 | 246 |
| | Compatibility test | R134a | — | Poor | Poor | — | — | Poor | Poor |

The composition of the monomers shown in Tables 2 to 5 is as described below.

- (a-1): 2,2,2-trifluoroethyl methacrylate, product name "Light Ester M4-3F", manufactured by Kyoeisha Chemical Co., Ltd.
- (a-2): 2,2,3,3,3-pentafluoropropyl methacrylate, manufactured by Tokyo Chemical Industry Co., Ltd.
- (a-3): 2-(perfluorooctyl)ethyl methacrylate, manufactured by Tokyo Chemical Industry Co., Ltd.
- (a-4): 2-(perfluorohexyl)ethyl methacrylate, manufactured by Tokyo Chemical Industry Co., Ltd.
- (b-1): Methyl methacrylate
- (b-2): Ethyl methacrylate
- (b-3): Isopropyl methacrylate
- (b-4): n-butyl methacrylate
- (b-5): Isobutyl methacrylate
- (b-6): tert-butyl methacrylate
- (b-7): n-dodecyl methacrylate
- (b-8): C14-C16 linear and branched alkyl methacrylate mixture (esterified product of Neodol 45 (manufactured by Shell Chemicals) and methacrylic acid)
- (b-9): n-octadecyl methacrylate
- (b-10): 2-n-dodecylhexadecyl methacrylate
- (b-11): 2-n-tetradecyloctadecyl methacrylate The oxygen atom-containing base oils (B) used in Tables 2 to 5 are as follows.

- (B-1) Diester of neopentyl glycol and 2-ethylhexanoic acid (kinematic viscosity at 40° C.: 7.45 mm$^2$/s, kinematic viscosity at 100° C.: 2.05 mm$^2$/s, viscosity index: 52, SP value: 8.79)
- (B-2) Diester of neopentyl glycol and 3,5,5-trimethylhexanoic acid (kinematic viscosity at 40° C.: 13.0 mm$^2$/s, kinematic viscosity at 100° C.: 3.1 mm$^2$/s, viscosity index: 95, SP value: 8.52)
- (B-3) Diester of 2-ethylhexanol and adipic acid (kinematic viscosity at 40° C.: 7.80 mm$^2$/s, kinematic viscosity at 100° C.: 2.40 mm$^2$/s, viscosity index: 135, SP value: 8.91)
- (B-4) Monoester of 2-ethylhexanol and 2-ethylhexanoic acid (kinematic viscosity at 40° C.: 2.70 mm$^2$/s, kinematic viscosity at 100° C.: 1.10 mm$^2$/s, viscosity index: 85, SP value: 8.45)
- (B-5) Tetraester of pentaerythritol and 3,5,5-trimethylhexanoic acid (kinematic viscosity at 40° C.: 114.1 mm$^2$/s, kinematic viscosity at 100° C.: 11.5 mm$^2$/s, SP value: 8.81)
- (B-6) Tetraester of pentaerythritol and 2-ethylhexanoic acid (kinematic viscosity at 40° C.: 45.3 mm$^2$/s, kinematic viscosity at 100° C.: 6.3 mm$^2$/s, viscosity index: 81, SP value: 9.15)

<Compatibility Between Copolymer and Oxygen Atom-Containing Base Oil (B) in Viscosity Index Improver>

The compatibility between the copolymer and the oxygen atom-containing base oil (B) in the viscosity index improver was evaluated according to the following evaluation criteria.

Evaluation Criteria

Good: Uniform appearance without insoluble fractions of the copolymer

Poor: Non-uniform appearance with insoluble fractions of the copolymer

Production of Refrigerating Machine Oil

The viscosity index improvers (R-1) to (R-18) and (R'-1) to (R'-7) and the oxygen atom-containing base oil (B) were subjected to temperature control in an atmosphere at 25° C. for 1 day. Further, the viscosity index improvers (R-1) to (R-18) and (R'-1) to (R'-7) and the oxygen atom-containing base oil (B) were mixed and stirred in the blending amounts shown in Tables 1 to 5 (rotation speed: 500 rpm) to produce refrigerating machine oils (1) to (18) and refrigerating machine oils (1') to (7') for comparison. The appearance of each of the refrigerating machine oils at the time of 5 minutes and 1 hour from the start of stirring was visually observed under a fluorescent white light at room temperature of 25° C. The solubility of the viscosity index improver (R) or (R') in the oxygen atom-containing base oil (B) was evaluated according to the following evaluation criteria.

Evaluation Criteria

Excellent: Dissolved in 5 minutes from the start of stirring, and uniform appearance without insoluble fractions of the copolymer Good: Dissolved in 1 hour from the start of stirring, and uniform appearance without insoluble fractions of the copolymer Poor: After 1 hour from the start of stirring, non-uniform appearance with insoluble fractions of the copolymer Method for Calculating Kinematic Viscosity and Viscosity Index of Refrigerating Machine Oil The kinematic viscosities at −40° C., −20° C., 40° C., and 100° C. were measured by the method described in JIS-K 2283, and the viscosity index was calculated using the measurement results of the kinematic viscosities at 40° C. and 100° C. The larger the value, the higher the viscosity index improving effect.

Test for Compatibility with Refrigerant (C) R134a

To 4 g of each of the refrigerating machine oils 1 to 18 or 4 g of each of the refrigerating machine oils 2', 3', 6', and 7' for comparison, 6 g of R134a as a typical saturated fluorinated hydrocarbon refrigerant was added (refrigerating machine oil concentration: 40 mass %). Then, the resultant mixture was cooled for 1 hour. It was visually confirmed whether each of the refrigerating machine oils was compatible with the refrigerant, and the compatibility was evaluated according to the following criteria. Further, 8.5 g of refrigerant R134a was added to 1.5 g of each of the refrigerating machine oils (refrigerating machine oil concentration: 15 mass %), and the compatibility was evaluated in a similar manner. The results are shown in Tables 2 to 5.

Evaluation Criteria

Excellent: In refrigerating machine oil concentrations of 15 mass % and 40 mass %, uniform appearance without insoluble fractions Good: Non-uniform appearance with insoluble fractions in the refrigerating machine oil concentration of 15 mass %, whereas uniform appearance without insoluble fractions in the refrigerating machine oil concentration of 40 mass %

Poor: In refrigerating machine oil concentrations of 15 mass % and 40 mass %, non-uniform appearance with insoluble fractions Test for Compatibility with Refrigerant (C) R1234yf To 4 g of each of the refrigerating machine oils 14 to 18 shown in Table 4 or 4 g of each of the refrigerating machine oils 2', 3', 6', and 7' for comparison shown in Table 5, 6 g of R1234yf as a typical unsaturated fluorinated hydrocarbon refrigerant was added (refrigerating machine oil concentration: 40 mass %). Then, the resultant mixture was cooled at −30° C. for 1 hour. It was visually confirmed whether each of the refrigerating machine oils was compatible with the refrigerant, and the compatibility was evaluated according to the following criteria. Further, 8.5 g of refrigerant R1234yf was added to 1.5 g of each of the refrigerating machine oils (refrigerating machine oil concentration: 15 mass %), and the compatibility was evaluated in a similar manner. The results are shown in Table 6.

Evaluation Criteria

Excellent: In refrigerating machine oil concentrations of 15 mass % and 40 mass %, uniform appearance without insoluble fractions Good: Non-uniform appearance with insoluble fractions in the refrigerating machine oil concentration of 15 mass %, whereas uniform appearance without insoluble fractions in the refrigerating machine oil concentration of 40 mass %

Poor: In refrigerating machine oil concentrations of 15 mass % and 40 mass %, non-uniform appearance with insoluble fractions

TABLE 6

|  | Example |  |  |  |  | Comparative Example |  |  |  |
|---|---|---|---|---|---|---|---|---|---|
|  | 19 | 20 | 21 | 22 | 23 | 8 | 9 | 10 | 11 |
| Refrigerating machine oil | 14 | 15 | 16 | 17 | 18 | 2' | 3' | 6' | 7' |
| (Viscosity index improver) | (R-14) | (R-15) | (R-16) | (R-17) | (R-18) | (R'-2) | (R'-3) | (R'-6) | (R'-7) |
| (Copolymer) | (A-14) | (A-15) | (A-16) | (A-17) | (A-18) | (A'-2) | (A'-3) | (A'-6) | (A'-7) |
| Evaluation results | Compatibility test R1234yf | Good | Excellent | Excellent | Excellent | Good | Poor | Poor | Poor | Poor |

The results in Tables 2 to 6 show that the viscosity index improver of the present invention is excellent in solubility in an oxygen atom-containing base oil and a refrigerant, has a high viscosity index improving effect, and has low low-temperature viscosity. Meanwhile, it is found that the viscosity index improvers of the Comparative Examples have low solubility in the oxygen atom-containing base oil or the refrigerant.

INDUSTRIAL APPLICABILITY

The viscosity index improver of the present invention is excellent in solubility in a refrigerant and an oxygen atom-containing base oil, has a high viscosity index improving effect when used in the refrigerating machine oil, and can obtain a refrigerating machine oil having excellent low-temperature characteristics. Thus, the viscosity index improver can be suitably used as a viscosity index improver for refrigerating machine oils. Further, the refrigerating machine oil of the present invention containing the viscosity index improver has a high viscosity index improving effect, is excellent in low-temperature viscosity characteristics, and is also excellent in compatibility with a refrigerant. Consequently, a working fluid that contains the refrigerating machine oil of the present invention and the refrigerant can circulate in a refrigeration system without delay, and thus is extremely useful. Furthermore, the refrigerating machine oil or the working fluid for refrigerating machines that contains the viscosity index improver of the present invention is suitably used in an air conditioner having a reciprocating or rotating hermetic compressor, a refrigerator, an open or closed automobile air conditioner, a dehumidifier, a water heater, a freezer, a freezing/refrigerating warehouse, a vending machine, a showcase, a refrigerating machine in a chemical plant or the like, a refrigerating machine with a centrifugal compressor, and the like.

The invention claimed is:

1. A viscosity index improver working fluid composition for refrigerating machines, comprising a viscosity index improver and a refrigerant, wherein the viscosity index improver comprises:

a copolymer (A) that contains, as essential constituent monomers, a fluorine atom-containing monomer (a) represented by the following formula (1) and a monomer (b) represented by the following formula (2), and an oxygen atom-containing base oil (B), wherein the copolymer (A) has a solubility parameter of 8.1 to 10.0 (cal/cm$^3$)/2, and a mass ratio (b/a) of the monomer (b) to the monomer (a) in the monomers constituting the copolymer (A) is 0.01 to 42, and a mass ratio (A/B) of the copolymer (A) and the oxygen atom-containing base oil (B) is 99/1 to 1/99:

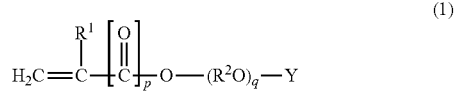

(1)

wherein R$^1$ represents a hydrogen atom or a methyl group; R$^2$ is a C2-C4 alkylene group; p is an integer of 0 or 1; q is an integer from 0 to 20, each R$^2$ may be the same as or different from each other when q is 2 or greater; and Y is a monovalent group in which one or more or all of hydrogen atoms in a C1-C40 hydrocarbon group are replaced by fluorine atoms, and

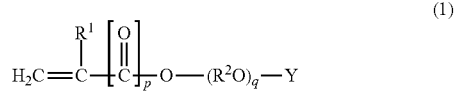

(2)

wherein R$^3$ represents a hydrogen atom or a methyl group; —X$^1$— is a group represented by —O— or —NH—; R$^4$ is a C2-C4 alkylene group; r is an integer of 0 or 1; s is an integer from 0 to 20, and each R$^4$ may be the same as or different from each other when s is 2 or greater; and R$^5$ is a C1-C40 hydrocarbon group.

2. The working fluid composition according to claim 1, wherein a constituent unit derived from the monomer (a) has a solubility parameter of 6.5 to 9.0 $(cal/cm^3)^{1/2}$.

3. The working fluid composition according to claim 1, wherein the copolymer (A) has a weight-average molecular weight of 1,000 to 2,000,000.

4. The viscosity index improver working fluid composition according to claim 1,
wherein the oxygen atom-containing base oil (B) is at least one selected from the group consisting of an ester oil (B1), a polyvinyl ether (B2), and a polyalkylene glycol (B3).

5. A working fluid composition for refrigerating machines, comprising a refrigerating machine oil and a refrigerant,
wherein the refrigerating machine oil comprises:
a lubricant base oil; and
a viscosity index improver,
wherein the lubricant base oil is an oxygen atom-containing base oil (B),
wherein the viscosity index improver comprises:
a copolymer (A) that contains, as essential constituent monomers, a fluorine atom- containing monomer (a) represented by the following formula (1) and a monomer (b) represented by the following formula (2):

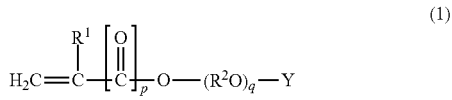

(1)

wherein $R^1$ represents a hydrogen atom or a methyl group; $R^2$ is a C2-C4 alkylene group; p is an integer of 0 or 1; q is an integer from 0 to 20, each $R^2$ may be the same as or different from each other when q is 2 or greater; and Y is a monovalent group in which one or more or all of hydrogen atoms in a C1-C40 hydrocarbon group are replaced by fluorine atoms, and

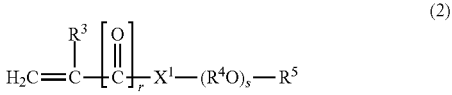

(2)

wherein $R^3$ represents a hydrogen atom or a methyl group; —$X^1$— is a group represented by —O— or —NH—; $R^4$ is a C2-C4 alkylene group; r is an integer of 0 or 1; s is an integer from 0 to 20, and each $R^4$ may be the same as or different from each other when s is 2 or greater; and $R^5$ is a C1-C40 hydrocarbon group,
wherein the copolymer (A) has a solubility parameter of 8.1 to 10.0 $(cal/cm^3)^{1/2}$,
a mass ratio (b/a) of the monomer (b) to the monomer (a) in the monomers constituting the copolymer (A) is 0.01 to 42, and
the content of the copolymer (A) is 1 to 20 mass % based on the total amount of the refrigerating machine oil.

6. The working fluid composition according to claim 5, wherein the oxygen atom-containing base oil (B) is at least one selected from the group consisting of an ester oil (B1), a polyvinyl ether (B2), and a polyalkylene glycol (B3).

7. The working fluid composition according to claim 5, wherein an absolute value of a difference between a solubility parameter of the copolymer (A) and a solubility parameter of the oxygen atom-containing base oil (B) is 2.0 $(cal/cm^3)^{1/2}$ or less.

8. The working fluid composition according to claim 5, wherein the oxygen atom-containing base oil (B) has a solubility parameter of 8.0 to 10.0 $(cal/cm^3)^{1/2}$.

9. The working fluid composition for refrigerating machines according to claim 1,
wherein the refrigerant is at least one refrigerant selected from the group consisting of a saturated fluorinated hydrocarbon refrigerant, an unsaturated fluorinated hydrocarbon refrigerant, and a natural refrigerant, or a mixed refrigerant of two or more of these refrigerants.

10. The working fluid composition according to claim 1, wherein an absolute value of a difference between a solubility parameter of the copolymer (A) and a solubility parameter of the oxygen atom-containing base oil (B) is 2.0 $(cal/cm^3)^{1/2}$ or less.

11. The working fluid composition according to claim 5, wherein a constituent unit derived from the monomer (a) has a solubility parameter of 6.5 to 9.0 $(cal/cm^3)^{1/2}$.

12. The working fluid composition according to claim 5, wherein the copolymer (A) has a weight-average molecular weight of 1,000 to 2,000,000.

13. The working fluid composition for refrigerating machines according to claim 5,
wherein the refrigerant is at least one refrigerant selected from the group consisting of a saturated fluorinated hydrocarbon refrigerant, an unsaturated fluorinated hydrocarbon refrigerant, and a natural refrigerant, or a mixed refrigerant of two or more of these refrigerants.

* * * * *